US012718238B2

(12) United States Patent
Hassan

(10) Patent No.: US 12,718,238 B2
(45) Date of Patent: Aug. 25, 2026

(54) APP PROFILE VERIFICATION IN COMPUTING DEVICES

(71) Applicant: Microsoft Technology Licensing, LLC, Redmond, WA (US)

(72) Inventor: Amer Aref Hassan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/677,593

(22) Filed: May 29, 2024

(65) Prior Publication Data

US 2025/0371535 A1 Dec. 4, 2025

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
CPC .......................... G06Q 20/401; G06Q 20/389
USPC .......................................................... 705/44
See application file for complete search history.

(56) References Cited

U.S. PATENT DOCUMENTS

| | | | | |
|---|---|---|---|---|
| 9,246,903 | B2 | 1/2016 | Adenuga | |
| 11,308,500 | B1 | 4/2022 | Russell | |
| 2001/0027527 | A1* | 10/2001 | Khidekel | H04L 63/10 726/9 |
| 2014/0365377 | A1 | 12/2014 | Salama | |
| 2015/0058220 | A1 | 2/2015 | Cazanas | |
| 2015/0088744 | A1 | 3/2015 | Raduchel | |
| 2015/0088754 | A1* | 3/2015 | Kirsch | H04L 63/08 713/171 |
| 2015/0249925 | A1 | 9/2015 | Haro | |
| 2015/0278805 | A1 | 10/2015 | Spencer, III | |
| 2015/0326559 | A1 | 11/2015 | Kuang | |
| 2015/0350169 | A1 | 12/2015 | Ksontini | |
| 2016/0125412 | A1* | 5/2016 | Cannon | G06Q 20/4014 705/44 |

(Continued)

FOREIGN PATENT DOCUMENTS

| | | | |
|---|---|---|---|
| CN | 113645627 | A | 11/2021 |
| CN | 116389037 | A | 7/2023 |
| CN | 116414633 | A | 7/2023 |
| EP | 2634739 | A1 | 9/2013 |
| WO | 2014147297 | A1 | 9/2014 |

OTHER PUBLICATIONS

Non-Final Office Action mailed on Sep. 10, 2025, in U.S. Appl. No. 18/677,758, 08 Pages.

(Continued)

*Primary Examiner* — Bennett M Sigmond
*Assistant Examiner* — Michael J Warden
(74) *Attorney, Agent, or Firm* — Schwegman Lundberg & Woessner, P.A.

(57) ABSTRACT

Methods, systems, and machine-readable mediums that enhance transaction authentication of a transaction of a first application by checking that a state of one or more other applications matches prespecified states or that one or more of those applications transition states within a prespecified period of time. For example, the prespecified states may correspond to the application being installed on a specified device (e.g., of the user) and having an authenticated session with a specified user.

20 Claims, 12 Drawing Sheets

(56) References Cited

U.S. PATENT DOCUMENTS

| | | | | |
|---|---|---|---|---|
| 2016/0241403 | A1* | 8/2016 | Lindemann | H04L 63/0861 |
| 2016/0314460 | A1 | 10/2016 | Subramanian | |
| 2017/0011382 | A1 | 1/2017 | Zoldi | |
| 2017/0091764 | A1 | 3/2017 | Lloyd | |
| 2017/0091765 | A1 | 3/2017 | Lloyd | |
| 2017/0109752 | A1 | 4/2017 | Hubbard et al. | |
| 2017/0206525 | A1* | 7/2017 | Sylvain | G06Q 20/4015 |
| 2019/0130405 | A1* | 5/2019 | Adams | G06Q 20/405 |
| 2019/0306198 | A1 | 10/2019 | Feiertag | |
| 2020/0186520 | A1* | 6/2020 | Oberheide | G06Q 20/356 |
| 2020/0327458 | A1 | 10/2020 | Dutt | |
| 2021/0295352 | A1 | 9/2021 | Lott | |
| 2022/0191272 | A1 | 6/2022 | Madisetti | |
| 2022/0318350 | A1* | 10/2022 | Hulick, Jr. | G06F 21/52 |
| 2023/0008975 | A1 | 1/2023 | Crudele | |
| 2023/0169499 | A1* | 6/2023 | John | G06Q 40/00 705/35 |
| 2023/0196374 | A1 | 6/2023 | Singh | |
| 2023/0412367 | A1* | 12/2023 | Bennison | H04L 9/0656 |
| 2024/0370837 | A1* | 11/2024 | Rozovski | G06Q 20/102 |
| 2025/0371126 | A1 | 12/2025 | Aref | |
| 2025/0371536 | A1 | 12/2025 | Aref | |
| 2025/0371545 | A1 | 12/2025 | Aref | |

OTHER PUBLICATIONS

International Search Report and Written Opinion received for PCT Application No. PCT/US2025/019066, mailed on Jul. 2, 2025, 13 pages.

International Search Report and Written Opinion received for PCT Application No. PCT/US2025/017102, mailed on Jun. 4, 2025, 15 pages.

International Search Report and Written Opinion received for PCT Application No. PCT/US2025/019067, mailed on Jun. 20, 2025, 14 pages.

International Search Report and Written Opinion received for PCT Application No. PCT/US2025/017099, mailed on Apr. 4, 2025, 16 pages.

Non-Final Office Action mailed on Dec. 17, 2025, in U.S. Appl. No. 18/677,721, 10 pages.

Non-Final office action mailed on Jan. 28, 2026, in U.S. Appl. No. 18/677,675, 12 pages.

Notice of Allowance mailed on Feb. 11, 2026, in U.S. Appl. No. 18/677,758, 16 Pages.

Notice of Allowance mailed on Mar. 25, 2026, in U.S. Appl. No. 18/677,721, 11 Pages.

* cited by examiner

APP PROFILE VERIFICATION IN COMPUTING DEVICES

TECHNICAL FIELD

Embodiments pertain to authentication. Some embodiments relate to authenticating a transaction on a first application using information (e.g., a state or state transition) of one or more applications different than the first application.

BACKGROUND

In the modern digital era, the authentication of transactions has become an important aspect of ensuring security and trust in various online and mobile platforms. Traditionally, transaction authentication has relied heavily on single-factor methods, such as passwords or PINS, which alone may not provide sufficient security against sophisticated cyber threats. As financial transactions, personal data exchanges, and other sensitive activities increasingly move online, there is a growing need for more robust authentication methods that can effectively prevent unauthorized access and fraud. Multi-factor authentication (MFA) systems have been developed to attempt to address these concerns. MFA systems require users to provide multiple forms of verification before a transaction can be processed. These MFA systems often combine two or more of something the user knows (like a password), something the user has (such as a mobile device), and something the user is (including biometrics) to enhance security.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
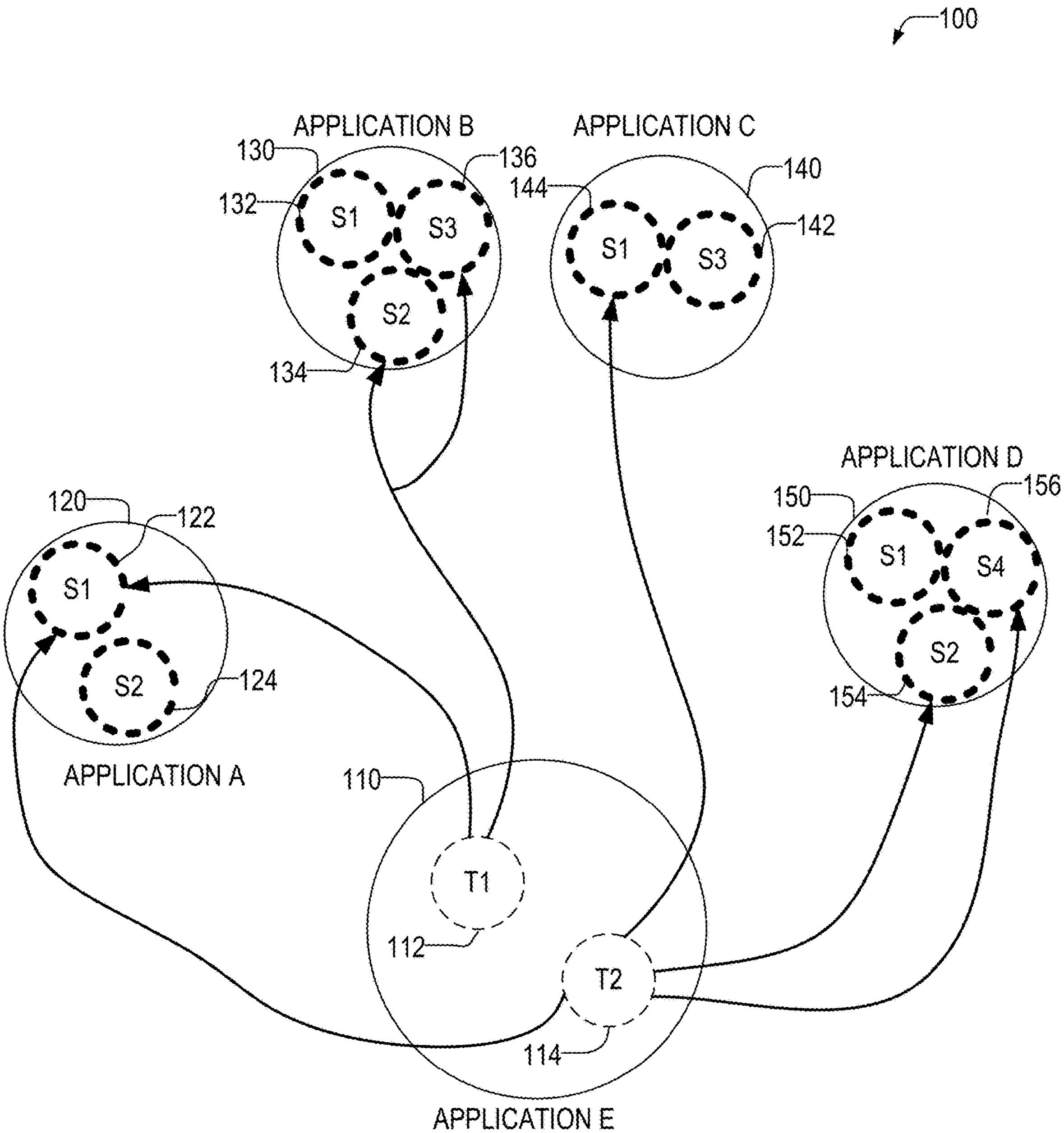
FIG. 1 illustrates a diagram of an example authentication relationship graph according to some examples of the present disclosure.

Despite the prevalence of MFA systems, nefarious users are still able to gain access to user accounts. For example, dictionary attacks and password leaks may enable nefarious users to determine a legitimate user's password. Sim swapping, a technique in which an attacker engages in social engineering techniques to transfer control of a user's phone service to their own phone devices allows nefarious users to intercept the One Time Passcodes (OTP) sent via text message to the user's phone. As a result of these attacks, new methods of authentication are needed to ensure both seamless and secure authentication.

Disclosed in some examples are methods, systems, and machine-readable mediums that enhance transaction authentication of a transaction of a first application by checking that a state of one or more other applications matches prespecified states or that one or more of those applications transition states within a prespecified period of time. For example, the prespecified states may correspond to the application being installed on a specified device (e.g., of the user) and having an authenticated session with a specified user. By utilizing authentication states or state transitions of other applications into the transaction process, the system provides a robust authentication framework that leverages characteristics of a user's personal application ecosystem to offer enhanced security against unauthorized access and fraud. This approach addresses the limitations of traditional authentication methods by adding a personalized layer of security that is more difficult for attackers to replicate than traditional MFA. This solves the technical problem of traditional weaknesses of authentication systems using the technical solution of state checking of other applications.

The authentication may be set up by initially determining the applications installed on one or more of the user's devices and the possible respective states of these applications. Security criteria may then be applied to evaluate which applications and which specific states of those applications meet the security criteria to authenticate a given transaction. This evaluation considers factors such as the sensitivity of the transaction, the security features of the applications, and the like. The resulting applications and states are stored in a transaction authorization data record, which outlines the applications and their states (or state transitions) for authenticating the transaction. Additionally, users may have the option to interact with the system by submitting input that accepts, rejects, or modifies the applications and/or their states used for authenticating a transaction. This user input can be used to tailor the authentication process further, allowing for a personalized security approach that aligns with the user's preferences and the specific security needs of each transaction.

In the authentication system, "application states" are defined as the various conditions or statuses that an application on a user's device can be in, which are used for determining whether the transaction can be authenticated. In some examples, the primary states may include: Installed: the application is installed on a user's device. Logged In (Authenticated) State: This state indicates that the user is actively logged into the application, with authentication credentials verified. Logged Out (Inactive) State: In this state, the user is not logged into the application, meaning no active session exists, and the application is not ready to perform actions that require user authentication. Background (Passive) State: Here, the application is not actively used but runs in the background. It may still receive updates and notifications, but user interaction is minimal. Error or Suspended State: This state occurs when the application encounters issues such as errors, suspensions due to security concerns, or other operational anomalies that might affect its functionality. In some examples, one or more states may be acceptable for authenticating a transaction. For example, the logged in and passive states may allow for authentication, whereas the logged out and error states may not.

In the authentication system, the determination of the possible states of applications is conducted either at setup time or periodically, using standardized and/or custom APIs. These APIs may interact either directly with the applications on the user's device or with servers providing the application services of those applications. A standardized API may be defined for applications to implement for the purposes of determining states and querying application states for authentication. The standardized API provides consistent and generalizable information across a wide array of applications, capturing common states such as 'logged in', 'logged out', 'active', or 'inactive'. This may provide broad compatibility and facilitates the integration of diverse applications into the system. For applications that do not implement the standardized API, custom APIs may be programmed into the authentication system for specific applications.

In other examples, instead of using an API, or in addition to an API, the system may also incorporate hard-coded information about the applications to define certain expected states. This hard coding is based on predefined knowledge about the applications' behaviors and characteristics, providing a baseline of state information that enhances the system's ability to quickly and accurately assess the security posture of an application.

Once all possible states are identified through these APIs, the system allows for the application of security criteria to determine which of these states are deemed secure enough to participate in the authentication process for a given transaction. In some examples, application states may be standardized from application-specific states to corresponding authentication system states. This may be achieved for example using prespecified rules or prespecified conversion tables.

In some examples, the application state may involve the user having an authenticated session with the application. In some examples, the authenticated session may not be specific to a particular account. That is, if a particular transaction on a first application is authenticated by having an authenticated state with a second application, any account authenticated with the second application may satisfy the application state requirements to authenticate the particular transaction. In other examples, the system may require a particular account to be in an authenticated state with the second application. The particular account may be specified in advance by explicit user input. In this setup, users are prompted to enter their corresponding usernames or identifiers for the other applications directly into the first application. An identifier of the specific account of the second application is then "linked" or "corresponds" to the account of the first application. The account identifiers may be stored in the transaction authorization data record.

The transaction authorization data record stores, for each potential transaction of an application, the applications, states, and/or state changes needed for authorizing the transaction. For example, a transaction authorization data record might list up to 10 different applications, each associated with one or more states that meet the authentication criteria. During the authentication process, the system may verify that all the listed applications are in one of its corresponding required states for authentication. Alternatively, the system may selectively use only a subset of these applications for authentication. For example, the system may randomly select a specified number of all the applications to use for a particular transaction. To successfully authentication the randomly selected applications in the subset must be in the specified states.

In some examples, the number of applications in the subset may be random. In other examples, the system may identify a threshold which may be prespecified or may be selected based upon a formula that considers the risk of the transaction. The transaction may then be authenticated if more than the threshold number of any of the applications that are listed in the transaction authorization data record are in the required states. In still other examples, the system may utilize a risk score of the transaction and corresponding security scores of the applications. That is, each <application,state> combination may be scored as to the level of authentication security it provides (e.g., by rules, or manually by an administrator). The subset may be selected so that the sum of the <application,state> scores equal or exceed a transaction risk score. A greater risk score increases the number and/or security level of the applications needed to authenticate. The risk score may be related to contextual factors of the transaction including the time of day, the perceived risk of the transaction, the geographical location of the user, and the historical security data associated with the user's account. By adjusting the authentication requirements based on these contextual elements, the system can provide appropriate security for high-risk transactions and simplify the process for lower-risk activities. This context-sensitive approach ensures that the authentication process adapts in real-time to the circumstances surrounding each transaction.

For example, if the transaction is at a time of day the user is expected to be asleep, the risk score will increase requiring additional verification in the form of having to authenticate using more secure applications or additional verification by having to authenticate to more applications than if the transaction is at a time of day the user is expected to be awake. Similarly, if the transaction is at a location not normally inhabited by the user, the risk score may increase such that the authentication may require additional verification in the form of having to authenticate using more secure applications or additional verification by having to authenticate to more applications than if the transaction is at a location the user is expected to be in. These factors may combine. Thus, if the transaction is both at a time and a location that is not normal for the user, even more stringent authentication requirements may be required.

In some examples, the applications may all be executing on a same device. That is, the applications used for authentication may be on a same device as the application authenticating the transaction. In other examples, the applications may be on different devices.

In some examples, the authentication of states of the other applications may be performed on the computing device where the application which is performing the transaction to be authenticated is happening. For example, the application may locally store the transaction authorization data record. In these examples, the application may utilize one or more APIs to effectuate an inter-process communication to query the application state of the other applications. In other examples, the authentication may occur on a network-based server providing a network-based service of the application. In these examples, the network-based service of the first application may query one or more network-based servers providing network-based services for the other applications.

In some examples, the applications may be on different devices. Embodiments in which the applications used for authenticating a transaction are on a separate device from the device used to perform the transaction may be useful in a scenario in which a user is attempting a transaction on an untrusted device, such as a publicly available computing device. Using the present disclosure in such a manner enhances security by requiring that for a transaction on a first application (e.g., a web application) on a first computing device (e.g., an untrusted device) to be authenticated, that other applications on other devices (e.g., trusted devices such as a mobile phone) are in particular states. This ensures that subsequent users of the untrusted device, or eavesdroppers who steal credentials on the untrusted device cannot gain access to the transaction without also having access to place the applications on the trusted device into the proper states.

In other examples, a transaction may require that an application not only be in a specific initial state but also transition to a second state within a predetermined period of time. In some examples, the state change may be a direct result of user interaction or action. For instance, an application may need to shift from an inactive or logged-out state to an active or logged-in state, initiated by the user entering credentials or engaging in a specific activity within the application. Other example activities used to transition to a different state include sending a text, sending an email, calling a number, changing preference settings, activating a UI control, or the like. This requirement for a state transition adds an additional verification layer, confirming that the individual interacting with the application is indeed the authorized user. This approach enhances security by ensuring comprehensive verification of both the user's presence and activity before processing any sensitive transactions on a device that might otherwise be compromised. The use of state transitions (which may also be stored in the transaction authorization data record) to transition states of applications on trusted devices may also be useful where the transaction is taking place on an untrusted device. Thus, if an eavesdropper (e.g., using a keylogger, shoulder surfing, or other technique) attempts to break into the user's account after their transaction on the untrusted device, they would also have to manipulate applications on a trusted device that is presumably outside the attacker's control.

The present authentication system may also be extended to prevent and/or mitigate the use of SIM swapping attacks on two-factor authentication techniques that utilize SMS-based One Time Passcodes (OTP). For example, the SMS applications may be enhanced to incorporate the authentication of the present disclosure. In these examples, displaying the received OTP code may be a transaction to be verified using the presence and state of other applications on the device. If the other applications are not in the proper states, the SMS is not displayed. If the other applications are in the proper states the SMS is displayed.

In these examples, the transaction of displaying the SMS may be a linked to another transaction (e.g., the transaction that requires the OTP to authenticate) by a second application (e.g., the application that requested the OTP). In these examples, the second application or its server may do the verification for the SMS app and provide a signal to the SMS app on whether to display the SMS. In other examples, the second application or its server may provide the transaction authorization data record to the SMS application or a server associated with the SMS application (e.g., a cell phone carrier server) and the SMS application or the server may do the verification. This may protect the code from devices which are not the user's devices. That is, while the attacker may have compromised the SIM of the user and may receive voice calls and text messages of the user, they are unlikely to have the applications needed to display the SMS active on their device and in the right states. In some examples, in addition to not displaying the SMS, the message may be deleted so the attacker cannot access that message. In still other examples, the SMS application or the second application may notify the second application server that the SMS could not be displayed and the OTP may be cancelled.

In yet other examples, the SMS is not even sent by the application server of the second application unless a cloud-based server (e.g., the application server of the second application) is able to verify the required applications and present and they are in the proper states.

The authentication method disclosed herein may also utilize the native dialer application and/or the SMS application as applications that need a certain state to authenticate a transaction on the legitimate user's device. In the case of SIM swapping, the native dialer and/or the SMS application may not be in the proper state as these applications may not be able to connect to the network as the network may reject their attempts to connect. As such, the application conducting the transaction may fail the transaction with a warning to the user that the user's SIM may have been compromised.

As previously noted, the applications and states that are needed to authenticate a particular transaction may not be the same each time. That is, from an entire pool of possible <application, state> tuples, a subset of tuples are selected for use in authenticating. The identity and quantity of the selected applications in the subset may be random, based upon geolocation, based upon indications of fraud (e.g., by requiring MORE applications and/or by requiring more authenticated states of those applications), the type of transaction (e.g., based upon the "risk" of the transaction) and/or other aspects.

FIG. 1 illustrates a diagram of an example authentication relationship graph 100 according to some examples of the present disclosure. In FIG. 1, five applications are shown as nodes (circles): application A 120, application B 130, application C 140, application D 150, and application E 110. Inside each application, bolded dashed circles represent the possible states certain of the applications may be in. An application state refers to the current condition or status of a software application at a given point in time, including all the data and information that defines its current configuration or execution context. In FIG. 1, application A 120 has possible states: S1 122 and S2 124; application B 130 has possible states: S1 132, S2 134, S3 136; application C has possible states: S1 144, and S3 142; application D has possible states: S1 152, S2 154, and S4 156. States with the same number across different applications (e.g., S1 122, 132, 144, and 152) may be the same states, equivalent states, or different states.

Instead of showing states within application E 110, the unbolded dashed circles shows two possible transaction types, transaction T1 112 and T2 114. A "transaction" refers to any action or series of actions performed by a user through an application that results in a change of state or data within a system. This includes, but is not limited to, financial operations such as transfers and payments, access requests to sensitive information, or any other interactive process that requires verification or authentication. A transaction is typically (but not always) initiated by a user and processed by the system, where it may interact with various other applications or services to complete the operation.

In FIG. 1, each transaction is connected via edges to one or more states of one or more other applications. These edges represent authorization relationships that specify the applications and states that are used to authenticate the transaction. Where the line splits to more than one state, the application may be in either state for a successful authentication. For example, to successfully authenticate transaction T1 112, application A 120 must be in state S1 122, and application B 130 may be in either state S2 134 or S3 136. In some examples, to authenticate the transaction, all applications must be in the states indicated by the edges, but in other examples, only a subset of applications must be in the states indicated by the edges. In FIG. 1, to authenticate transaction T2 114, application a 120 must be in state S1 122, application C 140 must be in state S1 144, and application D may be in either state S2 154 or state S4 156.

Figure 2:
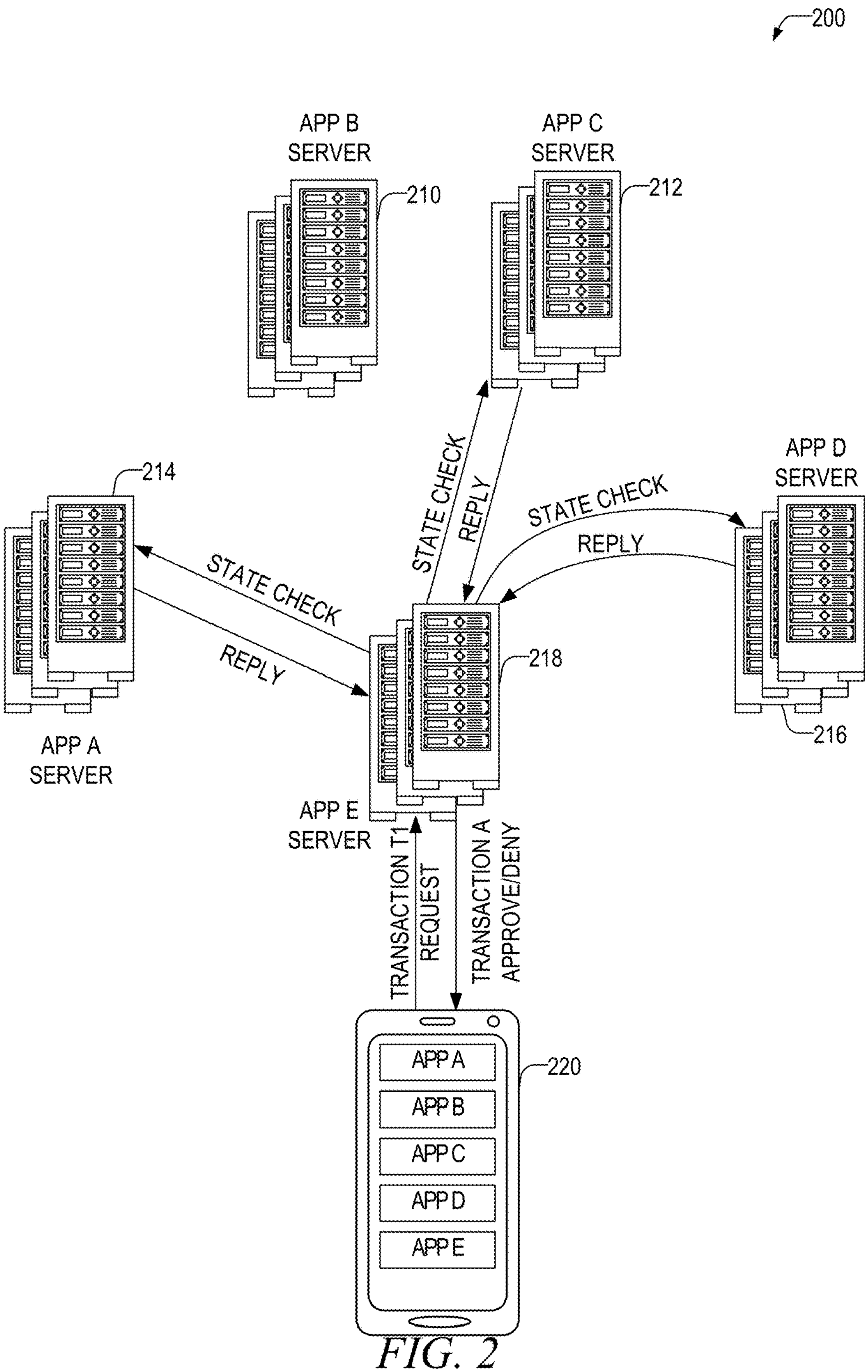
FIG. 2 illustrates a diagram of a system for authentication using application states according to some examples of the present disclosure.

FIG. 2 illustrates a diagram 200 of a system for authentication using application states according to some examples of the present disclosure. Each component of the system may be communicatively coupled to the other components through a network or a communication bus. The system includes a user computing device 220 with five applications, A-E along with application servers for each application (application A server 214, application B server 210, application C server 212, application D server 216, application E server 218). Application servers run application services that, along with applications executing on the user's devices, provide services for end users, other applications, or devices. The application service may provide the necessary infrastructure to run and manage application software, handle requests for operations, perform data processing, and deliver content or resources as required. Application servers may operate in a networked environment and provide the business logic and functional backend for software applications, facilitating a wide range of tasks from simple data retrieval to complex transaction processing. They often include comprehensive security, transaction management, and application services.

Applications on a user's device can either be dedicated applications or web-based applications. Dedicated applications, also known as native applications, are software programs developed specifically for a particular platform or device, installed directly onto the device, and designed to utilize its resources and capabilities to offer optimized performance and enhanced user experiences. On the other hand, web-based applications are hosted on remote servers (such as the application servers) and accessed over the internet using a web browser. These applications do not require installation on the user's device and provide the flexibility to be used across different platforms and devices, though they may depend heavily on internet connectivity for functionality.

Application E on the user computing device 220 may request to perform a transaction T1. This request is sent to the application E server 218 that provides the application service for application E. The application E server 218 may locate the transaction authorization data record for transaction T1. In some examples, the data record may be specific to a user. That is, the user account that is authenticated with application E may have a different transaction authorization data record for transaction T1 than other users. In the example shown in FIG. 2, applications A, C, and D are used to authenticate transaction T1. In these examples, the application service of application E, represented by application E server 218 contacts application services hosting applications A, C, and D to determine the state of each application on the user computing device 220 (or in some other examples, another device). These services then reply with the state information. The application service of application E may then evaluate whether the applications are in acceptable states to approve transaction T1. If the applications are in the acceptable states, the transaction is approved and a message approving the transaction is sent to application E. The operations to execute the transaction may then be carried out by either the application service for application E or on application E itself. If the applications are not in the acceptable states, the transaction is denied and a message denying the transaction may be sent to application E. Application E may then inform the user of the denial.

In some examples, application E may then inform the user of the denial and in some examples of what to fix, e.g., how to change the states of the other applications to the required states. In other examples, application E may not inform the user on how to fix the issue. The latter option may be more secure at the cost of user friendliness.

In some examples, the various application services may have the state information of the application executing on the user's device stored locally (e.g., in a data structure). In other examples, the various application services may message the applications on the user's device (these messages not shown for clarity).

Figure 3:
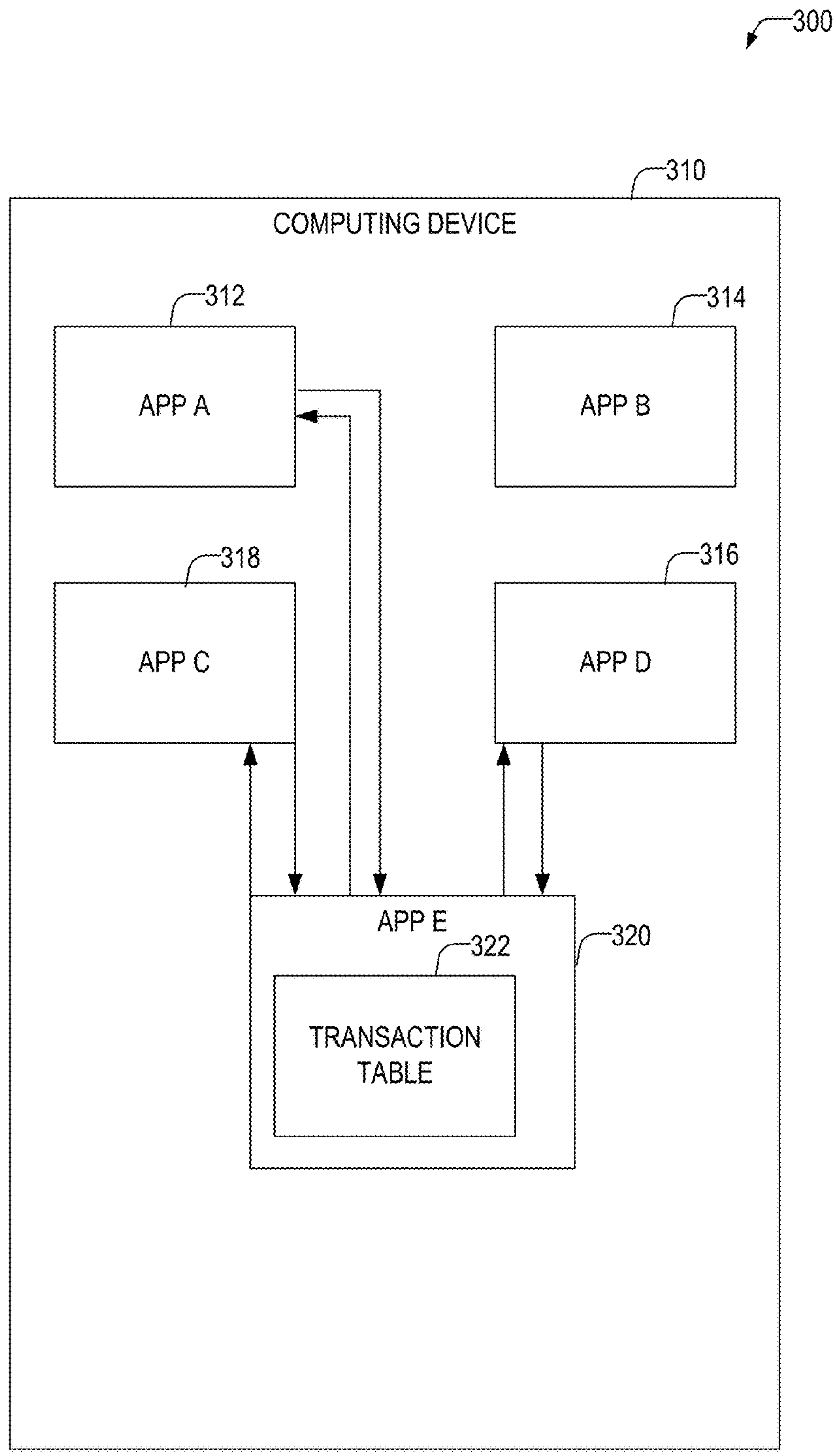
FIG. 3 illustrates a diagram of a system for authentication using application states according to some examples of the present disclosure.

FIG. 3 illustrates a diagram 300 of a system for authentication using application states according to some examples of the present disclosure. Diagram 300 shows an intra-device authentication where the application authenticating a transaction—in this example application E 320—contacts the other applications executing on the device for their state information in order to make the authentication decision. In this example, application E 320 contacts application A 312, application C 318 and Application D 316 but not application B 314. In these examples the transaction table 322 may hold one or more of the transaction authorization data records for the transactions. In some examples, these messages may be sent and received through inter-process communications according to one or more APIs.

While FIGS. 2 and 3 showed alternative ways of verifying an application's state, FIGS. 2 and 3 may be utilized in conjunction. For example, some transactions may be verified locally like in FIG. 3 and other transactions may be verified by the network-based services as shown in FIG. 2. This may be based upon transaction type. For example, riskier transactions may be verified by the network-based services whereas less risky transactions may be verified locally. In other examples, the transaction may be verified by the network-based service unless the network-based service is unreachable (e.g., due to network issues), in which case, the transaction may be verified locally. In some examples, the application itself may directly contact the various application services for the other applications.

Figure 4:
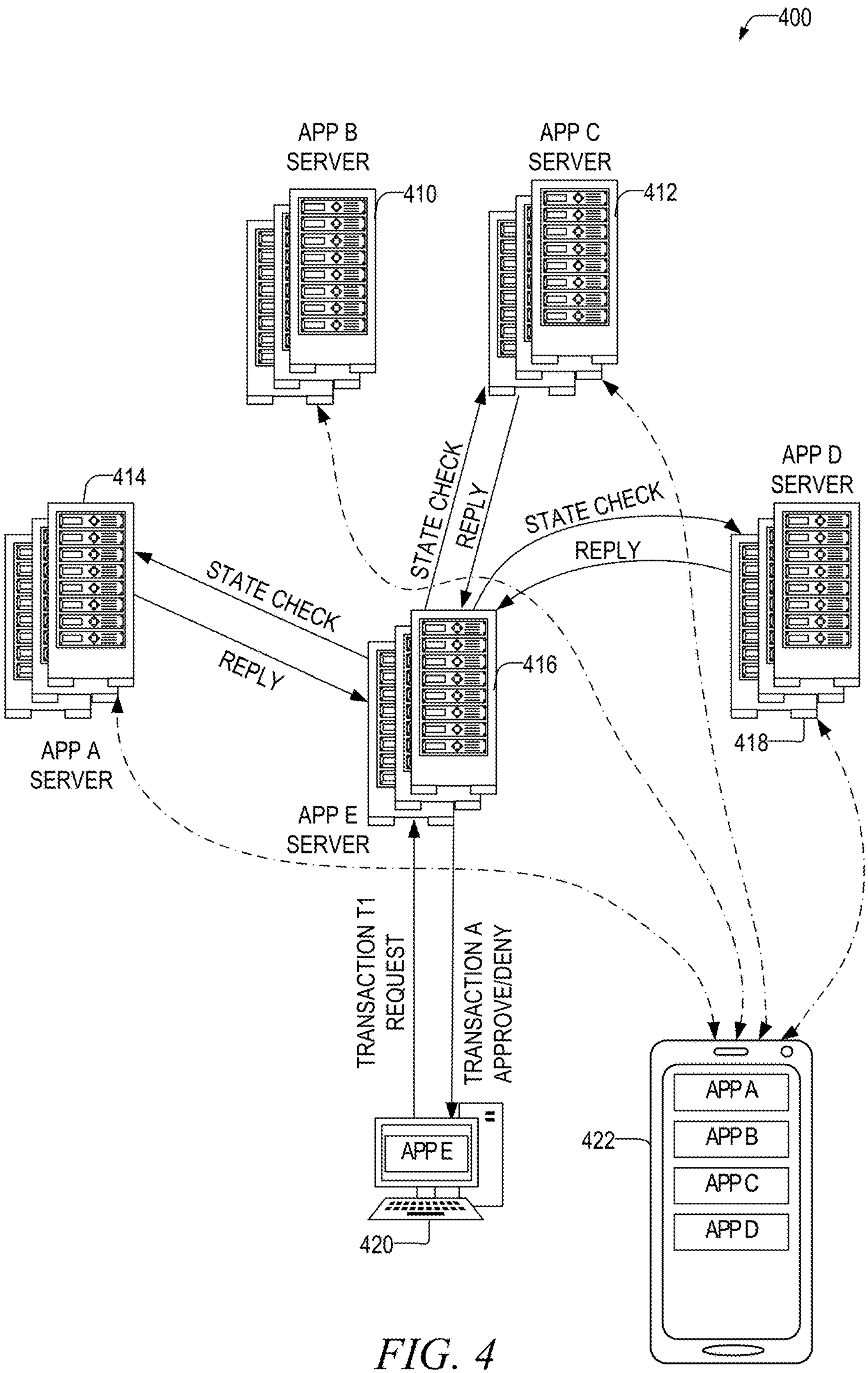
FIG. 4 illustrates a diagram of a system for authentication using application states according to some examples of the present disclosure.

FIG. 4 illustrates a diagram 400 of a system for authentication using application states according to some examples of the present disclosure. In FIG. 4, the application E is executing on a first computing device 420. In some examples, first computing device 420 may be an untrusted computing device. In the example of FIG. 4, the first application E executes a transaction that is authenticated using application states of applications executing on a second computing device 422. In some examples, second computing device 422 is a mobile device of the user.

Application E executing on the first computing device 420 requests to perform transaction T1 from the application E server 416. Application E server 416 consults the transaction authorization data record and determines that applications A, C, and D must be in specific states on the second computing device 422. In the example of FIG. 4, the application E server 416 may contact the application A server 414, application C server 412, and application D server 418. Application A server 414, application B server 410, application C server 412, and application D server 418 may be servers that provide services for their associated applications. In the example of FIG. 4, there may be messages, shown with dotted lines, between the various application servers and the second computing device 422 that requests an application state of the applications. Upon receiving the states of the applications, the application E server 416 makes a determine as to whether the applications are in the proper state. If the applications are in the proper state, the transaction may be approved and the application E executing on the first computing device 420 may be informed of this. The operations to implement the transaction may also be performed by the application E executing on first computing device 420 or application E server 416. If the applications are not in the proper state, the transaction may be denied and the application E notified of the denial. In some examples, application E may inform the user why the transaction was denied. In other examples, the application E may not inform the user why the transaction was denied.

While the example shown in FIG. 4 utilizes the application E server 416 to approve or deny the transaction, in other examples, application E may contact the various application servers and/or contact second computing device 422 using inter-device messaging and utilizing APIs of the applications to determine the application states. In still other examples some application states are determined by the application E on the first computing device 420, and in other examples, some of the other application states are determined by the application E server 416.

As previously noted, the applications and/or states necessary for authentication of a given transaction may vary. For example, at time T, a first set of applications may be required to be in a first set of states and at time T+1 a second set of applications may be required to be in a second set of states. In addition, the applications and/or states necessary for authentication may also vary based upon the context of the transaction. For example, a transaction deemed high-risk, such as a substantial financial transfer, may necessitate authentication from applications with stringent security features, such as banking or financial apps, which must be in a securely logged-in state. In contrast, a low-risk transaction, such as accessing content on a public news app, might only require basic authentication from applications with lower security demands. Furthermore, the geographical location of the user could also influence the authentication process; transactions initiated from regions known for high fraud rates might demand authentication from additional applications to verify the user's identity more rigorously. This adaptive approach allows the system to dynamically modify authentication requirements based on the perceived risk of the transaction, user location, and other relevant contextual factors, thereby enhancing security while optimizing user convenience.

In some examples, the applications and states necessary to authenticate a transaction may be determined using a risk score of the transaction. The transaction may first be scored using a risk scoring technique. Factors used in the risk score may include the type of transaction, the location of the user attempting the transaction, any recent fraudulent activity reported by the user, any other indications of fraud related to the user or transaction, and the like. In some examples, each of these factors may be scored and a weighted sum used to determine the transaction risk score. Likewise, each <application,state> tuple may be scored as to its security assurances. Applications and states may be automatically selected by the system such that the total of the security assurances of the <application,state> tuple meets or exceeds the risk score. Other algorithms may be utilized, for example, the risk score may set a minimum security assurance score that is needed to utilize the <application,state> tuple. In some examples, in addition to the minimum assurance score, the system may have a minimum total security assurance score of all <application,state> tuples.

Figure 5:
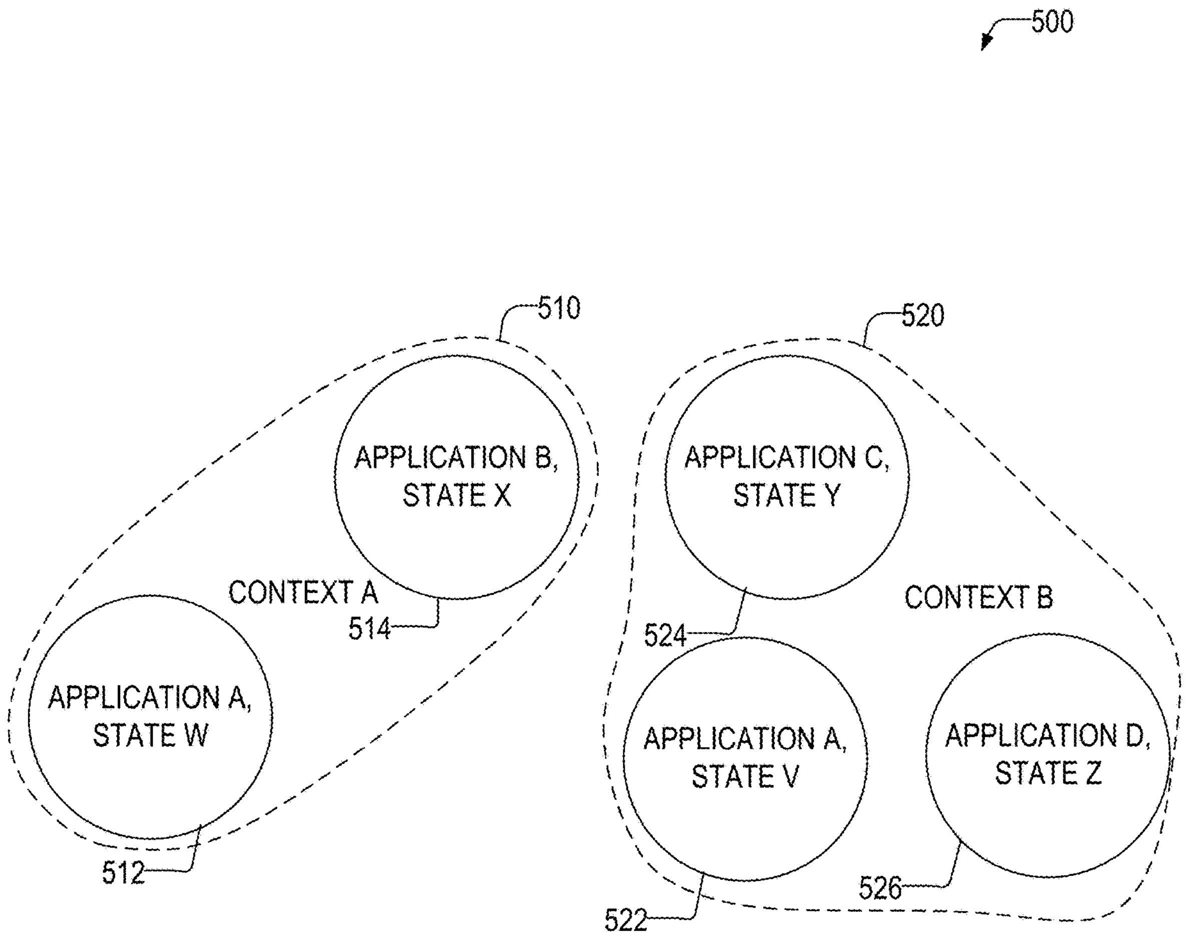
FIG. 5 illustrates a diagram of <application, state> tuple relationships based upon context according to some examples of the present disclosure.

FIG. 5 illustrates a diagram 500 of <application, state> tuple relationships based upon context according to some examples of the present disclosure. The diagram 500 relates to a particular transaction type and has two contexts: context A 510 and context B 520. When a first context, context A 510 is present, then for the transaction to be authenticated, application A must be in state W, represented by tuple 512 and application B must be in state X represented by tuple 514. When context B 520 is present, then for the transaction to be authenticated, application A must be in state V, represented by tuple 522; application C must be in state Y represented by tuple 524; and application D must be in state Z represented by tuple 526. A context may be defined by one or more factors. For example, in a simple case, context A is a first time—that is, a transaction placed during a time period a user is expected to be awake and context B may be a transaction placed during a time period a user is not expected to be awake. In other examples, other more complex combinations of circumstances may comprise a context. For example, a time and a geolocation of a user.

Figure 6:
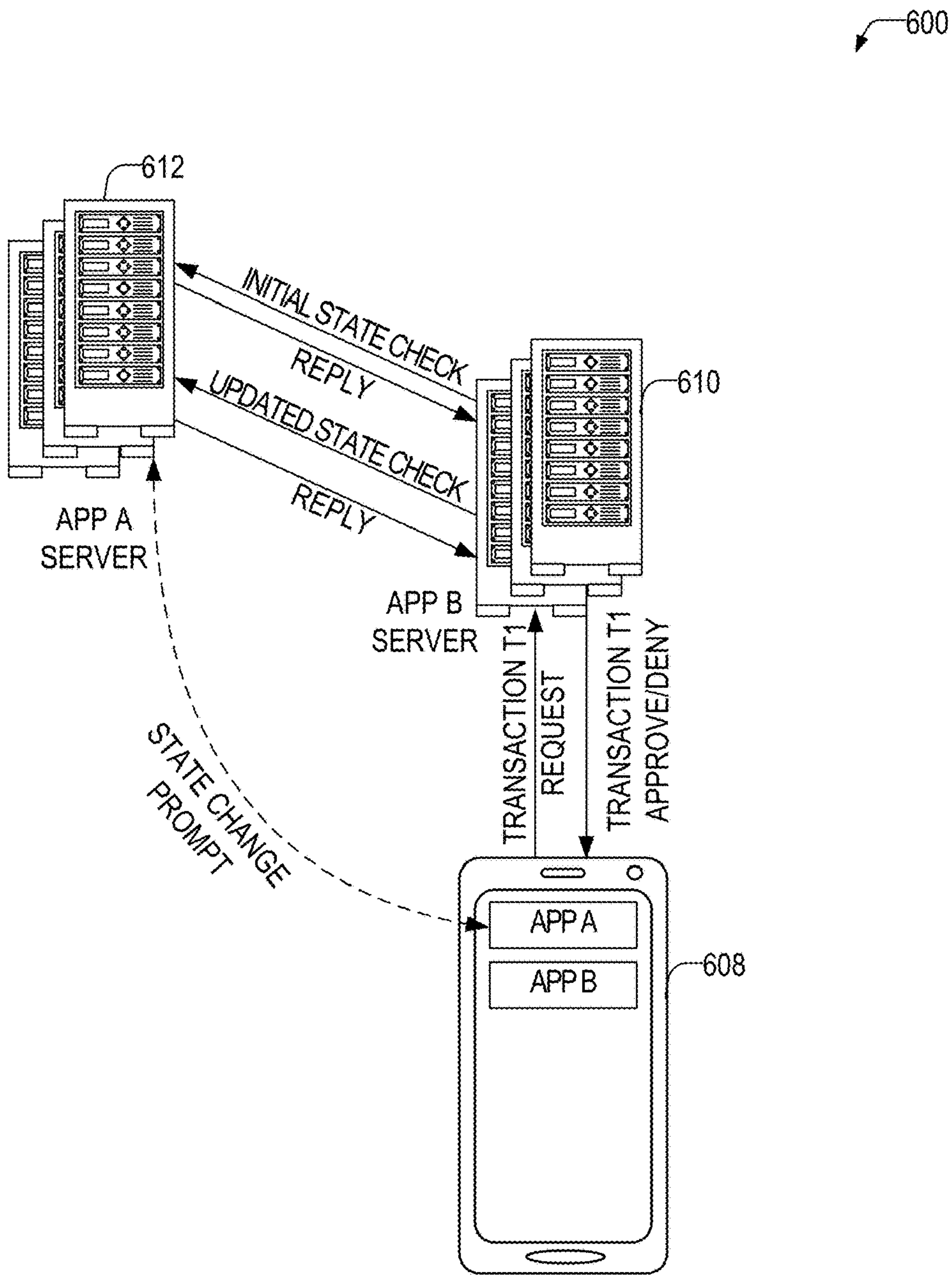
FIG. 6 illustrates a diagram of authenticating a transaction using an application state change according to some examples of the present disclosure.

As previously described transactions may be authenticated not just on the basis of a state of a different application, but also based upon a state-change of a different application. The authentication may depend on the state change happening within a prespecified time period. The state change may involve one or more user actions or transactions being made on the different application. FIG. 6 illustrates a diagram 600 of authenticating a transaction using an application state change according to some examples of the present disclosure. Application B on a user computing device 608 is requesting transaction T1 to application B server 610. Application B server 610 consults the transaction authorization data record corresponding to transaction T1. That record indicates that application A must change state from S1 to S2. In response the application B server 610 may do an initial state check of application A on user computing device 608. If the initial state is correct, then the application B server 610 either checks the state of application A again a threshold amount of time later (the threshold time may be related to the prespecified time period—e.g., just before or just after the expiry of the prespecified time period) or registers for a state change update from the application A server 612. In these latter examples, when the state of application A changes, application A server 612 identifies this change and notifies the application B server 610.

If the application A changed state from the required first state to the required second state within a required time, the transaction T1 may be authenticated and may be carried out. If the application A didn't start in the required state or didn't change to the required second state within the required time, the transaction may be denied. As shown in FIG. 6, in some examples, the state change may be related to a user's affirmative action with application A. In these examples, the user may be prompted to perform the action.

In the example of FIG. 6, the application B server and application A server communicate to determine the state of application A for authenticating a transaction on application B. In other examples, application B may directly contact the application A server 612 or directly contact application A on the users computing device 608. Additionally, while the authentication of transaction T1 was based upon a single application's state change (application A), in other examples, multiple state changes of multiple applications may be required. Similarly, multiple state changes may be required to authenticate a transaction. For example, the application A may have to change state to one or more other states in a state change sequence such as changing from state S1 to state S2 and finally to state S3. In yet other examples, some applications necessary for authentication of a transaction may only be required to be in a particular state and other applications may be required to change state. Furthermore, while FIG. 6 illustrated utilizing an application executing on a single users computing device, such as user computing device 608, the applications may be on different computing devices.

Figure 7:
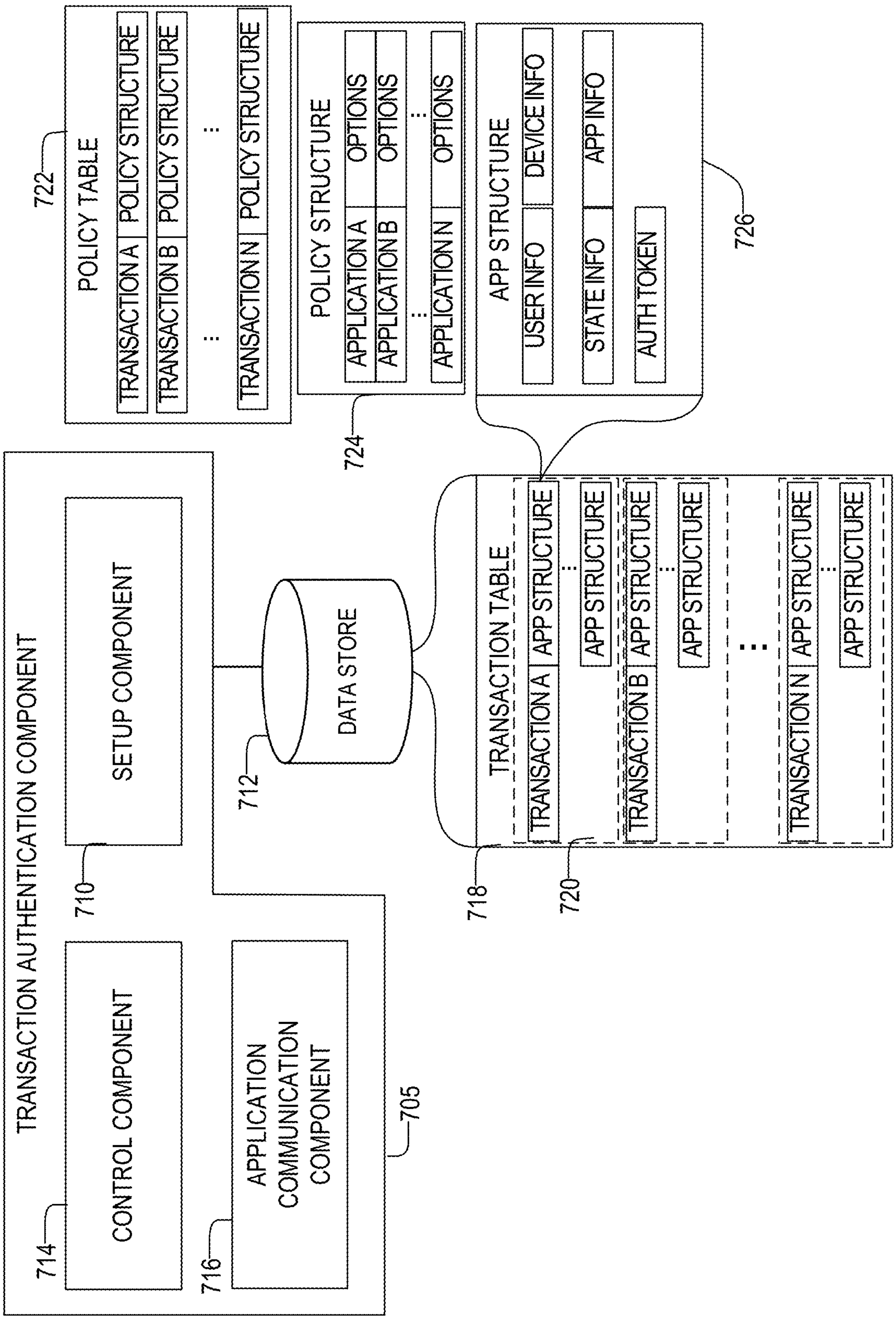
FIG. 7 illustrates a transaction authentication component according to some examples of the present disclosure.

FIG. 7 illustrates a transaction authentication component 705 according to some examples of the present disclosure. Transaction authentication component 705 may be executed as part of the application, the application service (e.g., executed by an application server), or portions of the transaction authentication component may be executed as part of the application and other portions may be executed as part of the application service (e.g., executed by an application server).

Transaction authentication component may include a control component 714, an application communication component 716, and a setup component 710. The transaction authentication component 705 may be communicatively coupled to a data store 712. Data store 712 may store a transaction table 718 which stores, for each transaction type of the application, a transaction authorization data record 720. The transaction authorization data record 720 may store an identifier of the transaction type and a list of applications associated with authenticating the transaction. Each application associated with authentication the transaction has an associated one or more application structures that describe information about each of the applications, including required states.

The application structure 726 may include user info (e.g., account information of the user of that application), device information (e.g., a device the application must be installed on and for which the state is verified), the states allowed for authenticating the transaction, application information, and in some examples an authentication token used to communicate with the application or its server over an API. In still other examples in which the set of applications used to authenticate a transaction may vary based upon the context, the transaction table may store, for each <context, transaction> tuple, a list of the app structures corresponding to that tuple. That is, for each context and transaction a list of applications and their states necessary for authenticating. In examples in which a state transition is needed to authenticate, the application structure may store both the initial state and a modified state as well as the time period in which the user has to transition the state from the initial state to the modified state.

In addition, the data store 712 may store a policy table 722. Policy table 722 may have a list of transactions and for each transaction a policy structure, such as policy structure 724. Policy structure 724 lists, for each transaction, acceptable applications for authorizing the transaction or criteria for determining acceptable applications as well as options for each application. Options may include acceptable states or criteria for determining acceptable states. The policy data may have applications listed that the user does not have installed or an account with. During setup when the user's applications are determined, the policy structure is then consulted to determine which of the user's applications, and in which states are acceptable for authenticating. These applications and states are then used to populate the transaction table 718.

The application communication component 716 may communicate with one or more devices and/or applications to determine the applications installed on a user's device(s). In some examples, the user may identify their devices and the application communication component may communicate with those devices to identify applications on those devices. For example, by sending a discovery message using one or more APIs, or by communicating with an operating system on those devices. In addition the application communication component 716 may communicate with the applications on those devices and/or with the application services providing services for those applications to determine the state of those applications.

The setup component 710 may utilize the list of applications and security policies (e.g., criteria), such as policy structure 724 and policy table 722 to determine which of those applications and which states of those applications are acceptable for authenticating a particular transaction.

The user may then be offered an opportunity to select the applications and states to authenticate each transaction from the list of <application, state> tuples that are acceptable as determined by the policies and/or criteria. In other examples, the system may select the applications and states to authenticate each transaction from the list of <application, state> tuples that are acceptable as determined by the policies and/or criteria.

In addition, the policies may specify a minimum number or threshold number of applications. For example, each <application, state> tuple may have an associated point number and the policy may specify that a threshold point total must be exceeded to authenticate. The system or user may then select <application,state> tuples until the threshold is exceeded.

Once the list of <application,state> tuples are determined, the setup component may populate the transaction table for each transaction with the application and state information. This may include authenticating with the application or application server of each application to obtain the authentication token. In some examples, the user also provides their username and device information for the device on which the application is executing. The user's username and device information may comprise part of the state information that may be verified by the system. That is, the application may have to be in a particular state on a particular device and associated with a specific account.

Control component 714 may receive and process transaction requests. The control component 714 may consult the data store 712 for the transaction authorization data record corresponding to the transaction requested (or in the case of context-based examples, the transaction authorization data record corresponding to the transaction and context). The control component 714 may then read the application structures and utilize the application communication component 716 to query the state of the applications. If the states of the applications match the state stored in the application structure of each application (or of a subset of applications in some examples), the transaction may be authenticated and in some examples executed. In examples in which the authentication utilizes state transitions, the control component 714 and application communication component 716 determines if the application transitions within the time period allotted and if so, the transaction is approved and executed. If the states do not match the state stored in the application structure or if one or more of the applications do not transition (in examples in which state transitions are utilized), then the transaction may be rejected. In some examples, the authentication mechanism described herein may be part of other authentication checks and processes used to authenticate a transaction. For example, the mechanisms described herein may be one factor in a multi-factor authentication scheme. Other factors may include user credentials, biometrics, and the like.

Figure 8:
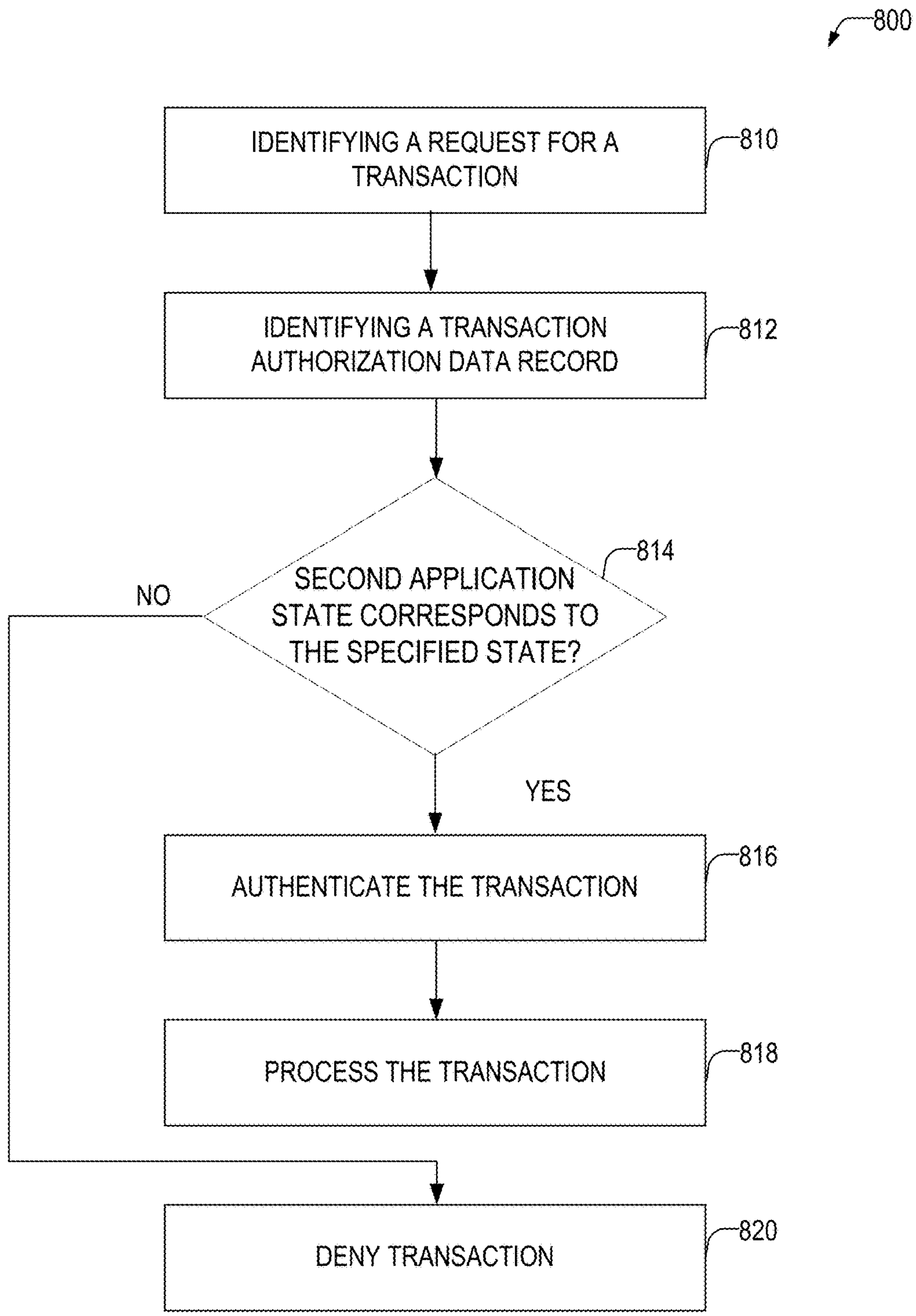
FIG. 8 is a flowchart of a method of authenticating a transaction on a computing device by verifying the state of a secondary application according to some examples of the present disclosure.

FIG. 8 is a flowchart of a method 800 of authenticating a transaction on a computing device by verifying the state of a secondary application according to some examples of the present disclosure. At operation 810, the method initiates by identifying a request for a transaction corresponding to a first application executing on the computing device. This first application may be a web application accessed through a browser or a dedicated application installed directly on the device. The user may already be logged into this first application, which facilitates the transaction request. The request itself may be made through a graphical user interface (GUI), where the user interacts with visual elements on the screen to initiate the transaction. Alternatively, the request could be initiated through other user interfaces such as voice commands, where the user verbally instructs the device to perform the transaction, or through automated scripts that trigger transactions based on predefined conditions or schedules.

At operation 812, the method involves identifying a transaction authorization data record corresponding to the transaction. This record specifies a second application and a required state of this second application that is indicative of the application being present on the device and a specific user account associated with the second application having an active authentication state. In some examples, the record specifies additional applications and application states. FIG. 7 illustrates the transaction authorization data record. In some examples, identifying the record includes reading it from a data store—e.g., by looking up the record using the transaction type and/or context to find the list of applications and their states. In some examples, the specified second application state is indicative of both the second application being resident on a specified computing device (such as the current device executing the first application) and a prespecified second user account associated with the second application having an active authentication state on the second application, the prespecified second user account being prespecified for use in authenticating the transaction for the first user account of the first application. For example, the user may specify the account during setup of the first application.

At operation 814, the method proceeds to determine, by communicating with the second application, an application state service, or the application server of the second application, whether the current state of the second application corresponds to the specified state. This communication is typically facilitated through an API that may use a security key previously obtained to ensure secure and authenticated interactions. The application state service, defined as a centralized service to which applications report their states, may also be utilized instead. This service acts as a repository and verifier of the state information of various applications, allowing for a centralized point of reference that the system can query to verify the state of the second application. Specific states required for the second application might include being installed on a particular device and actively logged in, having a secure session active, and/or being in a 'ready' state which indicates readiness to perform transactions or other secure operations. In some examples, this operation verifies that the second application is resident on the computing device and the prespecified second user account having the active authentication state with the second application.

If at operation 814, the second application does not correspond to the specific state, then at operation 820, the transaction may be denied. In some examples, the user may be notified as to the reason of the denial. In other examples, the user may not be notified. Not notifying the user may be more secure as it prevents an attacker from knowing which applications of the users to attempt to compromise next. If at operation 814, the second application corresponds to the specific state, then at operation 816, the transaction is authenticated. In response to the authentication, the transaction is processed at operation 818. "Processing" the transaction may refer to the series of actions taken after the transaction has been authenticated to complete the intended operation of the transaction. This may include updating records, transferring funds, executing commands, or modifying data as per the transaction's requirements.

In some examples, the transaction may require additional applications to be in particular states, in these examples, operations 814 may be repeated for each application. As previously noted, in some examples, all the applications must be in the particular states to authenticate the transaction. In these examples, if a single application fails the check at operation 814, then the transaction is denied. In other examples, a prespecified number of applications must be in the specified state to be authenticated. In these examples, the operation at 814 would increment a counter when an application is in the specified state. If the counter exceeds the threshold, then the transaction is authenticated at operation 816, otherwise it is denied at operation 820.

Figure 9:
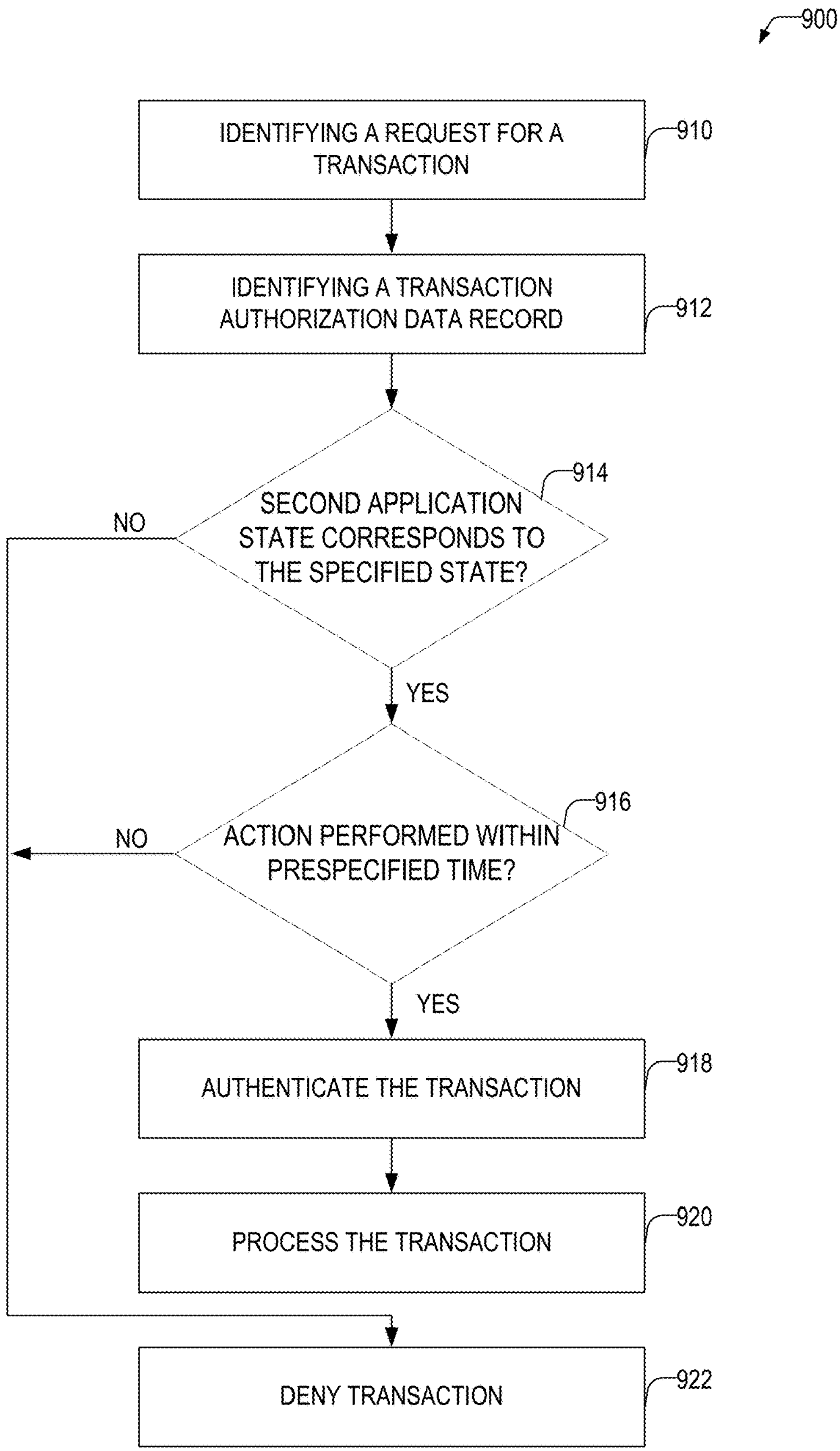
FIG. 9 is a flowchart of a method of authenticating a transaction on a computing device by verifying a state change of a secondary application according to some examples of the present disclosure.

FIG. 9 is a flowchart of a method 900 of authenticating a transaction on a computing device by verifying a state change of a secondary application according to some examples of the present disclosure. In some examples, FIG. 9 illustrates a scenario in which the second application is executing on a second computing device different than the first computing device upon which the first application is executing. This may be beneficial in instances in which the first computing device is untrusted, such as a public computing device.

At operation 910, the method begins by identifying a request for a transaction corresponding to a first application executing on a first computing device. This request is associated with a first user account of the first application. The request may be initiated through various user interfaces such as a graphical user interface (GUI), voice commands, or automated scripts.

At operation 912, in response to the transaction request, a transaction authorization data record is identified. This record specifies a second application executing on a second computing device, along with a required state and a state change for this second application. In some examples, additional applications and states may be identified. FIG. 7 illustrates the transaction authorization data record. In some examples, identifying the record includes reading it from a data store—e.g., by looking up the record using the transaction type and/or context to find the list of applications and their states. In some examples, the specified state indicates that the second application must be installed on the second computing device and that a prespecified second user account associated with the second application has an active authentication state. In method 900, in addition to requiring the application to start in a specified state, the application must also transition to another state indicated by the transaction authorization data record within a prespecified time period. The prespecified time period may be specified by an administrator or designer of the authentication system, an administrator or designer of the first application, specified by a user, or the like. The prespecified time period may be stored within the transaction authorization data record.

In some examples, actions that cause a state change may include a user logging in or out of the application; opening the application; user interactions such as accepting terms, changing settings, clicking buttons, or updating a profile; transactional actions related to different transactions than what is being authenticated, such as initiating a transfer, approving a payment, sending a communication, or confirming a receipt; biometric verifications such as providing a fingerprint, facial recognition, or voice verification.

At operation 914, the method involves determining, by communicating with the second application, an application state service, or the application server of the second application, whether the current state of the second application corresponds to the specified state. In some examples, this determination verifies that the second application is resident on the second computing device and that the prespecified second user account has the active authentication state with the second application. If at operation 914, the second application is not in the specified state, then the transaction may be denied at operation 922.

If at operation 914, the second application is in the specified state, then at operation 916, the method checks if the user performed a specified action within a prespecified time to effectuate the state change in the second application. The use of a state change increases a security level of the authentication system as it not only verifies that the applications are in a specified state, but that the user has control over the applications so as to effectuate a state change. In some examples, to verify the state change, the authentication system may recheck the application state, e.g., just before, at, or just after the prespecified time period. In other examples, the authentication system may register for state change notifications and the transaction is authenticated based upon receiving a notification indicating that the required state has changed in the required fashion before the prespecified time period elapses. In some examples, the prespecified time period begins at any time after operation 910 to operation 914.

If at operation 916, the state change does not occur within a prespecified time period, then the transaction may be denied at operation 922. If at operation 916, the state change does occur within the prespecified time period, then at operation 918, the transaction is authenticated. The method then proceeds to process the transaction upon successful authentication at operation 920. This processing may involve updating records, transferring funds, or executing commands as required by the transaction. If additional applications and states (optionally with state changes) are required to authenticate the transaction, the operations of 914, and 916 may be repeated for each application and authenticating the transaction at operation 918 may only be done if all the required, or the threshold number of required applications are in the required states or have transitioned to the required states.

Figure 10:
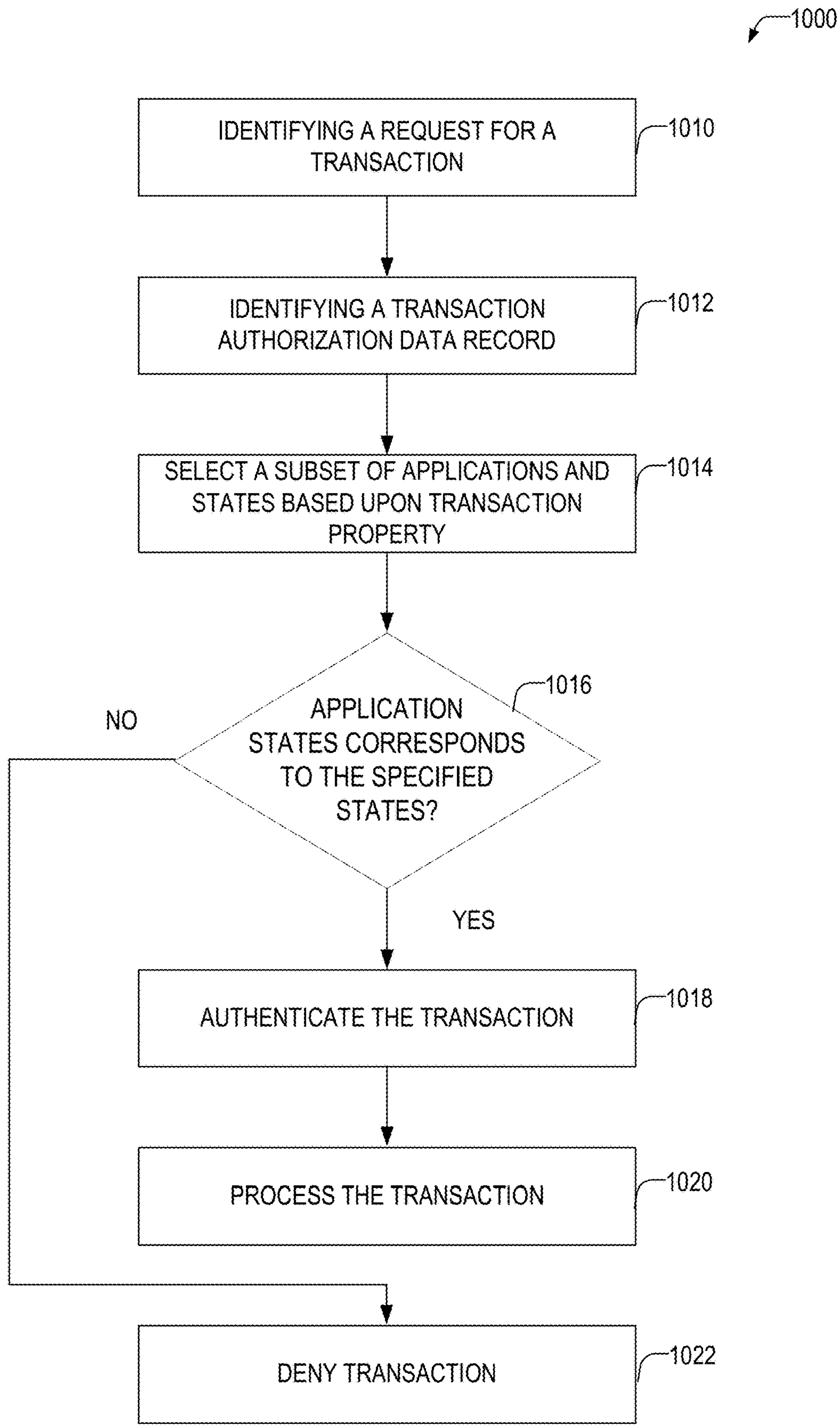
FIG. 10 is a flowchart of a method of authenticating a transaction on a computing device by verifying the state of multiple applications according to some examples of the present disclosure.

FIG. 10 is a flowchart of a method 1000 of authenticating a transaction on a computing device by verifying the state of multiple applications according to some examples of the present disclosure. At operation 1010, a first application or an application server of the first application, using one or more processors, automatically identifies a request for the transaction corresponding to the first application installed on the computing device. The transaction is associated with a first user account of the first application. The request may be initiated through various user interfaces such as a graphical user interface (GUI), voice commands, or automated scripts.

At operation 1012, in response to the transaction request, a transaction authorization data record is identified. This record specifies one or more applications executing on a second computing device, along with a required state and/or a state change for this second application. FIG. 7 illustrates the transaction authorization data record. In some examples, identifying the record includes reading it from a data store—e.g., by looking up the record using the transaction type and/or context to find the list of applications and their states.

At operation 1014, responsive to identifying the request and looking up the transaction authorization data record, the method involves selecting, based on a property of the transaction, from the transaction authorization data record corresponding to the transaction, both a subset of a plurality of other applications from a prespecified set of other applications and for each application in the subset, a required state. In some examples, each authentication state is indicative of at least the application being resident on a specified computing device and the application having an active authentication state of a prespecified user account associated with the application. The selected subset is different than a second subset that would be selected based upon a property of a second transaction different than the property of the transaction.

The properties of a transaction that may be used to select applications for authentication purposes can include various factors such as a random number generated for the transaction, the type of transaction, the risk associated with the transaction, the geolocation of the user, and/or other security-related criteria. For example, the type of transaction may be used as different transaction types may require different levels of security. For example, a high-value financial transaction might require verification from banking and financial apps that have robust security features, whereas a less sensitive transaction might only require verification from less secure, commonly used apps. The risk associated with the transaction may also be used. Risk factors like unusual transaction amounts or destinations might prompt the selection of additional or more secure applications for authentication. This ensures an added layer of security by involving multiple checkpoints. The geolocation of the user can also influence application selection. If a transaction is initiated from a location that is unusual for the user, the system might require authentication from applications that provide location services or enhanced security measures to verify the legitimacy of the transaction and the identity of the user.

Other properties may include:

- Time of Transaction: Transactions occurring at unusual times, such as late at night or early in the morning, might be flagged as higher risk. This could prompt the selection of more secure applications or those with additional verification steps to authenticate the transaction.
- Transaction Frequency: If a user suddenly initiates transactions more frequently than usual, this could trigger the use of applications and states for higher levels of security.
- Device Security Status: The overall security status of the device being used for the transaction (e.g., whether the device is jailbroken or has security features enabled) may be used to determine which applications are selected. More secure applications might be required if the device's integrity is potentially compromised.
- User Behavior Patterns: Applications that analyze user behavior and patterns could be selected if the transaction deviates from the user's normal behavior. This could include transactions in unusual categories or amounts that differ significantly from typical transactions.
- Network Security Level: The security level of the network from which the transaction is initiated (e.g., public Wi-Fi vs. a secure home network) might influence the choice of applications. Transactions over less secure networks might require authentication through applications that provide additional encryption or security measures.
- Historical Fraud Data: If the transaction involves entities (like bank accounts or locations) previously associated with fraudulent activities, applications specializing in historical data analysis and fraud detection might be selected to authenticate the transaction.
- Regulatory Requirements: For certain types of transactions, especially in regulated industries like banking or healthcare, specific applications might be required to comply with legal and regulatory standards. These applications would ensure that transactions meet all necessary compliance checks.

In some examples, the set of applications used for authentication may be random, may change over time—e.g., be based upon the current time, or the like.

At operation 1016, according to the transaction authorization data record, the method determines, for each particular application in the subset, by communicating with the particular application, an application state service, or the application server of the particular application, whether a current state of the particular application corresponds to the specified authentication state. In some examples, this determination verifies that the particular application is resident on the specified computing device and the particular application has an active authentication state of the prespecified user account associated with the application.

If at operation 1016 the applications in the subset are not in the correct state, then at operation 1022, the transaction may be denied. If at operation 1016, the applications in the subset are in the proscribed states, then the transaction is authenticated at operation 1018 and processed at operation 1020. This processing may involve updating records, transferring funds, or executing commands as required by the transaction.

Figure 11:
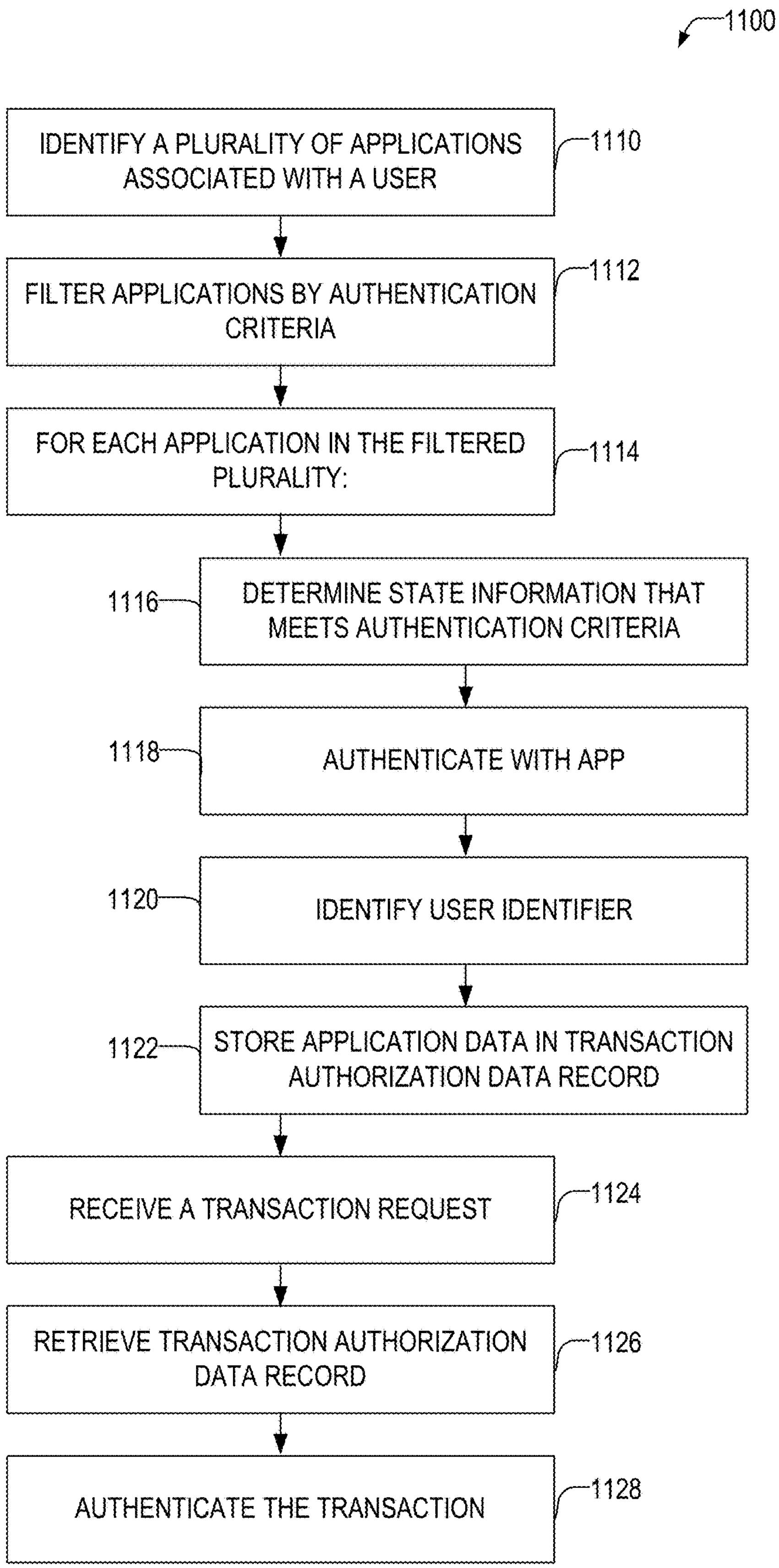
FIG. 11 is a flowchart of a method of establishing applications and states for authentication of a transaction according to some examples of the present disclosure.

FIG. 11 is a flowchart of a method 1100 of establishing applications and states for authentication of a transaction according to some examples of the present disclosure. At operation 1110, a plurality of applications associated with a user are identified. This operation may be performed by accessing the user's device or devices, either directly or via a network connection. The system may query the device's operating system or a dedicated application management service to retrieve a list of installed applications. This may involve calling APIs that provide information about the applications currently installed or running on the device. Additionally, the system may access user-specific data, such as login records or application usage logs, to determine which applications are not only installed but also actively used and associated with the user.

At operation 1112, for a particular type of transaction to be initiated by a first application, a subset of the plurality of applications that meet specified authentication criteria is selected. In some examples, the criteria may be predefined by system administrators or security policy managers based on the security requirements of the transaction, the sensitivity of the data involved, and the overall security posture of the organization. These criteria can be defined during the system setup and can be updated as needed to adapt to new security challenges or changes in organizational policy. Administrators may use a management console or a dedicated configuration file to set and modify these criteria. The authentication criteria may specify one or more applications or one or more properties of the applications that are allowed based upon the transaction. The properties of the applications may be determined by APIs or a central service. The authentication criteria may then be compared with the application properties to determine whether the application satisfies the authentication criteria for the transaction. For example, the criteria may indicate that certain applications are trusted applications.

At operation 1114, for each application in the filtered plurality of applications, the operations of 1116-1122 are performed. At operation 1116 state information of each particular application in the subset that meets the specified authentication criteria is determined. The states of each application may be determined using APIs or the application management service previously described. In some examples, the states may be obtained with the application information previously retrieved for operation 1112. In some examples, the states may be converted into standardized states. For example, each application may have their own specific states and prior to determining which states meet the authentication criteria, the states may be converted into a standard state. The states may be converted based upon conversion rules for each application. In some examples, the criteria may directly specify which states of which applications are acceptable for each transaction. In other examples, the criteria may specify rules for states that set a minimum level of security. Properties of states may be obtained through the APIs or application management service and compared against the rules to determine if the state meets the rules.

At operation 1118, authentication with the particular application, an application server of the particular application, or an application state service is performed to obtain an authentication key. This operation may be performed, for example, to obtain an authentication key to query the state of the application when a transaction is initiated. To obtain an authentication key in some examples, the process may involve several steps. Initially, the user must authorize the requesting application to access the target application, typically facilitated through an OAuth flow. During this phase, the user is redirected to the service provider's authentication page to log in and grant the necessary permissions. Upon successful authorization, the service provider redirects back to the requesting application with an authorization code, a short-lived token that can be exchanged for an access token. The requesting application then submits this authorization code, along with its client ID and client secret, to the service provider's token endpoint. These credentials, obtained during the application's registration with the service provider, authenticate the application's identity. If the authorization code, client ID, and client secret are validated, the service provider issues an access token to the requesting application. This access token is used by the application to make API requests on behalf of the user, included in the HTTP header of API requests as a Bearer token. This inclusion informs the service provider of the associated user and ensures the request's authorization. Access tokens generally have a limited lifespan; once expired, the application may use a refresh token, received alongside the access token, to obtain a new access token without requiring further user authorization. In some examples, these tokens may be stored in the transaction authorization data record, such is in an application structure that stores application information such as application structure 726 of FIG. 7.

At operation 1120, a user identifier for the user on the particular application and a unique device identifier where the application is installed are identified. For example, the user may supply a username of the application. In some examples, this operation happens with operation 1118 when a user logs into the other application.

At operation 1122, application data for the particular application is stored in a transaction authorization data record in a database, the application data comprises the state information, user identifier, authentication key, and device identifier.

At operation 1124, a transaction request in the first application corresponding to the particular type of transaction to be initiated is received, and in response, the transaction authorization data record from the database for the transaction type is retrieved at operation 1126.

At operation 1128, the transaction is authenticated by verifying, for each particular application indicated in the transaction authorization data record, that the particular application is executing on a device with the correct device identifier and that the particular application is in the required state, wherein the verification uses the stored user identifier, communication channel information, and authentication key to interact with the application, its server, or an application state service.

Figure 12:
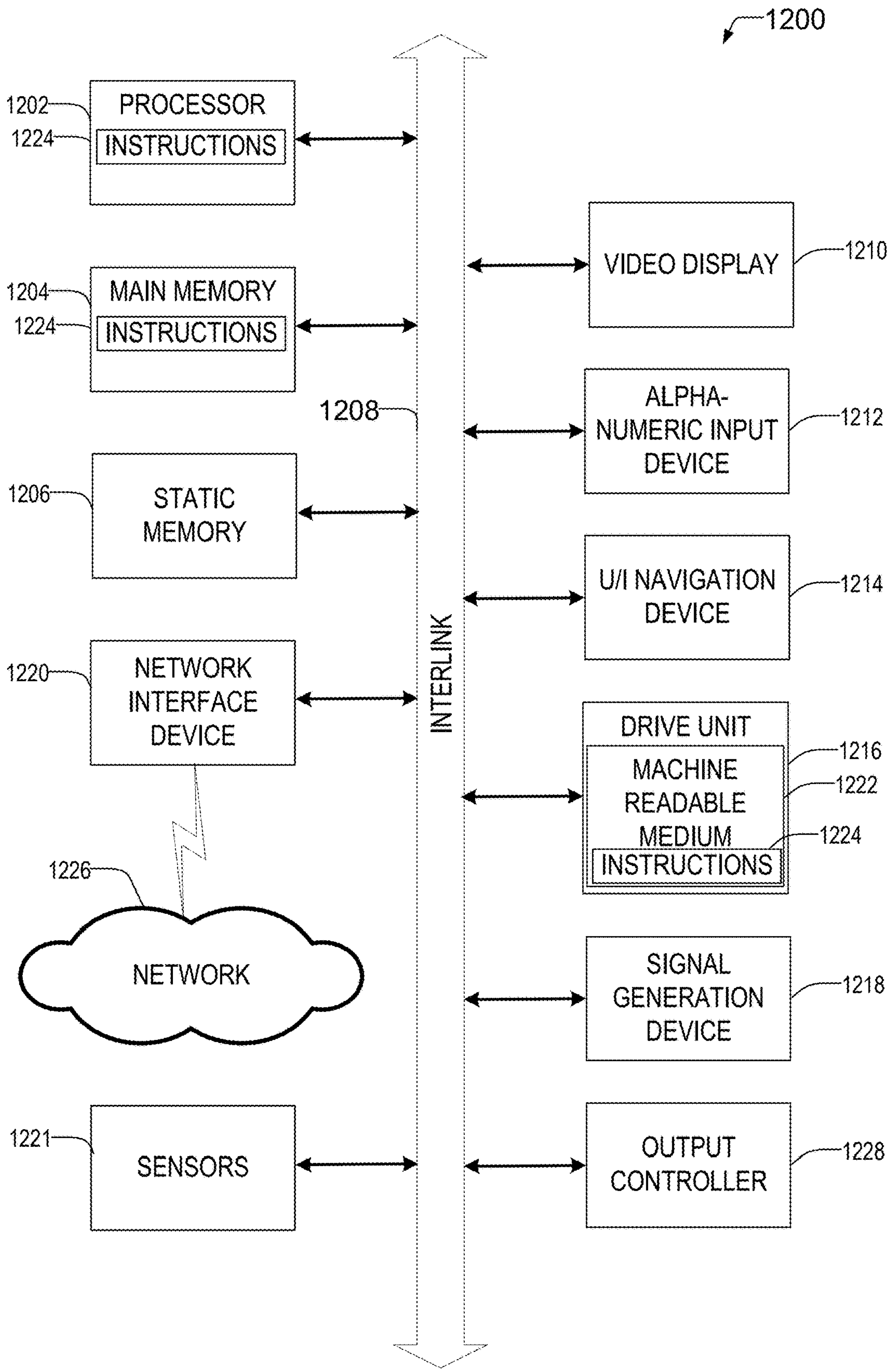
FIG. 12 is a block diagram illustrating an example of a machine upon which one or more embodiments may be implemented.

FIG. 12 illustrates a block diagram of an example machine 1200 upon which any one or more of the techniques (e.g., methodologies) discussed herein may be performed. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be in the form of a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. In some examples, machine 1200 may be, or be configured to store the relationships shown in FIG. 1 or 5, be or implement any of the components of FIGS. 2-4, 6, and 7 and implement the methods of FIGS. 8-11.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium—also referred to herein as a computer-readable medium or machine-readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 1200 may include one or more hardware processors, such as processor 1202. Processor 1202 may be a central processing unit (CPU), a graphics processing unit (GPU), a hardware processor core, or any combination thereof. Machine 1200 may include a main memory 1204 and a static memory 1206, some or all of which may communicate with each other via an interlink (e.g., bus) 1208. Examples of main memory 1204 may include Synchronous Dynamic Random-Access Memory (SDRAM), such as Double Data Rate memory, such as DDR4 or DDR5. Interlink 1208 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1224 may further be transmitted or received over a communications network 1226 using a transmission medium via the network interface device 1220. The Machine 1200 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. In some examples, the network interface device 1220 may wirelessly communicate using Multiple User MIMO techniques.

OTHER NOTES AND EXAMPLES

Example 1 is a method for authenticating a transaction on a computing device, comprising: at a first application or an application server of the first application, using one or more processors, automatically: identifying a request for the transaction corresponding to the first application executing on the computing device, the transaction associated with a first user account of the first application; and responsive to identifying the request: identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application; according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record: authenticating the transaction based on a verification that the second application is in the specified second application state; and processing the transaction upon successful authentication.

In Example 2, the subject matter of Example 1 includes, wherein the transaction authorization data record includes a list of applications and corresponding states required for transaction verification based upon a type of the transaction.

In Example 3, the subject matter of Examples 1-2 includes, the step of sending a notification to a user to log into the second application if the second application is in a non-logged-in state.

In Example 4, the subject matter of Examples 1-3 includes, identifying a second request for a second transaction of a type different than the transaction, the second transaction corresponding to the first application and associated with the first user account of the first application; and responsive to identifying the second request: identifying a third application, a fourth application, a specified third application state, and a specified fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state: authenticating the second transaction; and processing the second transaction upon the successful authentication.

In Example 5, the subject matter of Examples 1-4 includes, wherein the second application is selected from a group of applications preselected by a user.

In Example 6, the subject matter of Examples 1-5 includes, wherein identifying the current state of the second application further comprises verifying that a unique identifier of an authenticated session of the second application corresponds to a unique identifier of the computing device.

In Example 7, the subject matter of Examples 1-6 includes, identifying a second request for a second transaction of a type different than the transaction, the second transaction corresponding to the first application and associated with the first user account of the first application; and responsive to identifying the second request: identifying a third application and a specified third application state based upon a transaction authorization data record and the transaction, wherein the specified third application state is indicative of whether the third application is in a logged-in state or a non-logged-in state with respect to a third defined user account associated with the third application, the third defined user account having a prespecified relationship with the first user account of the first application; identifying a current state of the third application by communicating with the third application, the application state service, or a third application server of the third application; determining that a current state of the third application corresponds to the specified third application state; and responsive to determining that the current state of the third application corresponds to the specified third application state: authenticating the second transaction based on a verification that the third application is in the specified third application state; and processing the second transaction upon successful authentication.

In Example 8, the subject matter of Examples 1-7 includes, identifying a second request for a second transaction of a type different than the transaction, the second transaction corresponding to the first application and associated with the first user account of the first application; and responsive to identifying the second request: identifying, based upon the second transaction, a third application state of the second application, the third application state different than the specified second application state; identifying a current state of the second application by communicating with the second application, the application state service, or the application server of the first application; determining that the current state of the second application corresponds to the third application state; and responsive to determining that the current state of the second application corresponds to the third application state: authenticating the transaction based on a verification that the second application is in the third application state; and processing the second transaction upon successful authentication.

In Example 9, the subject matter of Examples 1-8 includes, wherein the operations are performed without user input.

In Example 10, the subject matter of Examples 1-9 includes, receiving an identifier of the transaction, the second application, and the prespecified second user account from a user in a graphical user interface; and populating the transaction authorization data record using the received identifier, the second application, and the prespecified second user account.

In Example 11, the subject matter of Examples 1-10 includes, wherein the transaction is authenticating a user to the first application.

In Example 12, the subject matter of Examples 1-11 includes, identifying a second request for a second transaction corresponding to the first application executing on the computing device, the second transaction associated with the first user account of the first application; and responsive to identifying the second request: identifying a second transaction authorization data record corresponding to the second transaction, the second transaction authorization data record specifying, corresponding to the second transaction, the second application and a specified third application state, wherein the specified third application state is different than the specified second application state; according to the second transaction authorization data record, determining, by communicating with the second application, the application state service, or the application server of the second application, whether a current state of the second application corresponds to the specified third application state; and responsive to determining that the current state of the second application does not corresponds to the specified third application state according to the transaction authorization data record, failing the authentication and denying the transaction.

In Example 13, the subject matter of Examples 1-12 includes, identifying a second request for a second transaction of a type different than the transaction, the second transaction corresponding to the first application and associated with the first user account of the first application; and responsive to identifying the second request: identifying a third application, a fourth application, a specified third application state, and a fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application does not correspond to the specified third application state or the current state of the fourth application does not correspond to the fourth application state; and responsive to determining that the current state of the third application does not correspond to the specified third application state or the current state of the fourth application does not correspond to the fourth application state: denying the authentication and cancelling the transaction.

Example 14 is a computing device for authenticating a transaction, the computing device comprising: a hardware processor; a memory, storing instructions, which when executed by the hardware processor, causing the hardware processor to perform operations comprising: at a first application or an application server of the first application, automatically: identifying a request for the transaction corresponding to the first application executing on the computing device, the transaction associated with a first user account of the first application; and responsive to identifying the request: identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application; according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record: authenticating the transaction based on a verification that the second application is in the specified second application state; and processing the transaction upon successful authentication.

In Example 15, the subject matter of Example 14 includes, wherein the transaction authorization data record includes a list of applications and corresponding states required for transaction verification based upon a type of the transaction.

In Example 16, the subject matter of Examples 14-15 includes, wherein the operations further comprise sending a notification to a user to log into the second application if the second application is in a non-logged-in state.

In Example 17, the subject matter of Examples 14-16 includes, wherein the operations further comprise: identifying a second request for a second transaction of a type different than the transaction, the second transaction corresponding to the first application and associated with the first user account of the first application; and responsive to identifying the second request: identifying a third application, a fourth application, a specified third application state, and a specified fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state: authenticating the second transaction; and processing the second transaction upon the successful authentication.

In Example 18, the subject matter of Examples 14-17 includes, wherein the second application is selected from a group of applications preselected by a user.

In Example 19, the subject matter of Examples 14-18 includes, wherein the operations of identifying the current state of the second application further comprises verifying that a unique identifier of an authenticated session of the second application corresponds to a unique identifier of the computing device.

In Example 20, the subject matter of Examples 14-19 includes, wherein the operations further comprise: identifying a second request for a second transaction of a type different than the transaction, the second transaction corresponding to the first application and associated with the first user account of the first application; and responsive to identifying the second request: identifying a third application and a specified third application state based upon a transaction authorization data record and the transaction, wherein the specified third application state is indicative of whether the third application is in a logged-in state or a non-logged-in state with respect to a third defined user account associated with the third application, the third defined user account having a prespecified relationship with the first user account of the first application; identifying a current state of the third application by communicating with the third application, the application state service, or a third application server of the third application; determining that a current state of the third application corresponds to the specified third application state; and responsive to determining that the current state of the third application corresponds to the specified third application state: authenticating the second transaction based on a verification that the third application is in the specified third application state; and processing the second transaction upon successful authentication.

In Example 21, the subject matter of Examples 14-20 includes, wherein the operations further comprise: identifying a second request for a second transaction of a type different than the transaction, the second transaction corresponding to the first application and associated with the first user account of the first application; and responsive to identifying the second request: identifying, based upon the second transaction, a third application state of the second application, the third application state different than the specified second application state; identifying a current state of the second application by communicating with the second application, the application state service, or the application server of the first application; determining that the current state of the second application corresponds to the third application state; and responsive to determining that the current state of the second application corresponds to the third application state: authenticating the transaction based on a verification that the second application is in the third application state; and processing the second transaction upon successful authentication.

In Example 22, the subject matter of Examples 14-21 includes, wherein the operations are performed without user input.

In Example 23, the subject matter of Examples 14-22 includes, wherein the operations further comprise: receiving an identifier of the transaction, the second application, and the prespecified second user account from a user in a graphical user interface; and populating the transaction authorization data record using the received identifier, the second application, and the prespecified second user account.

In Example 24, the subject matter of Examples 14-23 includes, wherein the transaction is authenticating a user to the first application.

In Example 25, the subject matter of Examples 14-24 includes, wherein the operations further comprise: identifying a second request for a second transaction corresponding to the first application executing on the computing device, the second transaction associated with the first user account of the first application; and responsive to identifying the second request: identifying a second transaction authorization data record corresponding to the second transaction, the second transaction authorization data record specifying, corresponding to the second transaction, the second application and a specified third application state, wherein the specified third application state is different than the specified second application state; according to the second transaction authorization data record, determining, by communicating with the second application, the application state service, or the application server of the second application, whether a current state of the second application corresponds to the specified third application state; and responsive to determining that the current state of the second application does not corresponds to the specified third application state according to the transaction authorization data record, failing the authentication and denying the transaction.

In Example 26, the subject matter of Examples 14-25 includes, wherein the operations further comprise: identifying a second request for a second transaction of a type different than the transaction, the second transaction corresponding to the first application and associated with the first user account of the first application; and responsive to identifying the second request: identifying a third application, a fourth application, a specified third application state, and a fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application does not correspond to the specified third application state or the current state of the fourth application does not correspond to the fourth application state; and responsive to determining that the current state of the third application does not correspond to the specified third application state or the current state of the fourth application does not correspond to the fourth application state: denying the authentication and cancelling the transaction.

Example 27 is a computer-readable storage device, storing instructions for authenticating a transaction at a first application or an application server of the first application, the instructions, when executed by a computing device, cause the computing device to perform operations comprising: identifying a request for the transaction corresponding to the first application executing on the computing device, the transaction associated with a first user account of the first application; and responsive to identifying the request: identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application; according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record: authenticating the transaction based on a verification that the second application is in the specified second application state; and processing the transaction upon successful authentication.

In Example 28, the subject matter of Example 27 includes, wherein the transaction authorization data record includes a list of applications and corresponding states required for transaction verification based upon a type of the transaction.

In Example 29, the subject matter of Examples 27-28 includes, wherein the operations further comprise sending a notification to a user to log into the second application if the second application is in a non-logged-in state.

In Example 30, the subject matter of Examples 27-29 includes, wherein the operations further comprise: identifying a second request for a second transaction of a type different than the transaction, the second transaction corresponding to the first application and associated with the first user account of the first application; and responsive to identifying the second request: identifying a third application, a fourth application, a specified third application state, and a specified fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state: authenticating the second transaction; and processing the second transaction upon the successful authentication.

In Example 31, the subject matter of Examples 27-30 includes, wherein the second application is selected from a group of applications preselected by a user.

In Example 32, the subject matter of Examples 27-31 includes, wherein the operations of identifying the current state of the second application further comprises verifying that a unique identifier of an authenticated session of the second application corresponds to a unique identifier of the computing device.

In Example 33, the subject matter of Examples 27-32 includes, wherein the operations further comprise: identifying a second request for a second transaction of a type different than the transaction, the second transaction corresponding to the first application and associated with the first user account of the first application; and responsive to identifying the second request: identifying a third application and a specified third application state based upon a transaction authorization data record and the transaction, wherein the specified third application state is indicative of whether the third application is in a logged-in state or a non-logged-in state with respect to a third defined user account associated with the third application, the third defined user account having a prespecified relationship with the first user account of the first application; identifying a current state of the third application by communicating with the third application, the application state service, or a third application server of the third application; determining that a current state of the third application corresponds to the specified third application state; and responsive to determining that the current state of the third application corresponds to the specified third application state: authenticating the second transaction based on a verification that the third application is in the specified third application state; and processing the second transaction upon successful authentication.

In Example 34, the subject matter of Examples 27-33 includes, wherein the operations further comprise: identifying a second request for a second transaction of a type different than the transaction, the second transaction corresponding to the first application and associated with the first user account of the first application; and responsive to identifying the second request: identifying, based upon the second transaction, a third application state of the second application, the third application state different than the specified second application state; identifying a current state of the second application by communicating with the second application, the application state service, or the application server of the first application; determining that the current state of the second application corresponds to the third application state; and responsive to determining that the current state of the second application corresponds to the third application state: authenticating the transaction based on a verification that the second application is in the third application state; and processing the second transaction upon successful authentication.

In Example 35, the subject matter of Examples 27-34 includes, wherein the operations are performed without user input.

In Example 36, the subject matter of Examples 27-35 includes, wherein the operations further comprise: receiving an identifier of the transaction, the second application, and the prespecified second user account from a user in a graphical user interface; and populating the transaction authorization data record using the received identifier, the second application, and the prespecified second user account.

In Example 37, the subject matter of Examples 27-36 includes, wherein the transaction is authenticating a user to the first application.

In Example 38, the subject matter of Examples 27-37 includes, wherein the operations further comprise: identifying a second request for a second transaction corresponding to the first application executing on the computing device, the second transaction associated with the first user account of the first application; and responsive to identifying the second request: identifying a second transaction authorization data record corresponding to the second transaction, the second transaction authorization data record specifying, corresponding to the second transaction, the second application and a specified third application state, wherein the specified third application state is different than the specified second application state; according to the second transaction authorization data record, determining, by communicating with the second application, the application state service, or the application server of the second application, whether a current state of the second application corresponds to the specified third application state; and responsive to determining that the current state of the second application does not corresponds to the specified third application state according to the transaction authorization data record, failing the authentication and denying the transaction.

In Example 39, the subject matter of Examples 27-38 includes, wherein the operations further comprise: identifying a second request for a second transaction of a type different than the transaction, the second transaction corresponding to the first application and associated with the first user account of the first application; and responsive to identifying the second request: identifying a third application, a fourth application, a specified third application state, and a fourth application state based upon a second transaction authorization data record and the second transaction; identifying a current state of the third application by communicating with the third application, the application state service, or a third application server of the third application; identifying a current state of the fourth application by communicating with the fourth application, the application state service, or a fourth application server of the fourth application; determining that a current state of the third application does not correspond to the specified third application state or the current state of the fourth application does not correspond to the fourth application state; and responsive to determining that the current state of the third application does not correspond to the specified third application state or the current state of the fourth application does not correspond to the fourth application state: denying the authentication and cancelling the transaction.

Example 40 is a method for authenticating a transaction of a first application executing on a first computing device, the method comprising: at the first application or an application server of the first application, using one or more processors, automatically: identifying a request for a transaction corresponding to the first application, the transaction associated with a first user account of the first application; responsive to identifying the request: identifying a transaction authorization data record corresponding to the transaction, the transaction authorization data record specifying, corresponding to the transaction, a second application executing on a second computing device, a specified second application state, and a specified second application state change, wherein the specified second application state is indicative of: the second application being resident on the second computing device, a prespecified second user account associated with the second application having an active authentication state on the second application, and wherein the second application state change comprises an action performed by a user at the second application within a prespecified time, the prespecified second user account being prespecified for use in authenticating the transaction for the first user account of the first application; according to the transaction authorization data record, determining, by communicating with the second application, an application state service, or the application server of the second application: whether a current state of the second application corresponds to the specified second application state, the determination verifying that the second application is resident on the first computing device and the prespecified second user account having the active authentication state with the second application; and whether the user performed the specified action within the prespecified time to effectuate the second application state change; and responsive to determining that the current state of the second application corresponds to the specified second application state according to the transaction authorization data record and that the user performed the specified action within the prespecified time: authenticating the transaction based on a verification that the second application is in the specified second application state; and processing the transaction upon successful authentication.

In Example 41, the subject matter of Example 40 includes, wherein the first application, second application, or both are web applications.

In Example 42, the subject matter of Examples 40-41 includes, wherein the specified action performed by the user on the second application is activating a user interface control.

In Example 43, the subject matter of Examples 40-42 includes, wherein the first computing device is an untrusted public device.

In Example 44, the subject matter of Examples 40-43 includes, wherein searching the transaction authorization data record using the transaction to identify the second application on the second computing device and the specified second application state comprises searching the transaction authorization data record using the type of transaction being authenticated.

In Example 45, the subject matter of Examples 40-44 includes, wherein searching the transaction authorization data record using the transaction to identify the second application on the second computing device and the specified second application state comprises searching the transaction authorization data record using risk scores associated with the user, first computing device, or the transaction.

In Example 46, the subject matter of Examples 40-45 includes, wherein searching the transaction authorization data record using the transaction to identify the second application on the second computing device and the specified second application state comprises searching the transaction authorization data record using the geolocation of the user.

In Example 47, the subject matter of Examples 40-46 includes, providing a notification on one of the first application, the second application, or both the first and second application to perform the specified action.

Example 48 is a first computing device executing a first application or part of a first application server for authenticating a transaction of a first application, the computing device comprising: a hardware processor; a memory, the memory storing instructions, which when executed by the hardware processor, causes the computing device to perform operations comprising: identifying a request for a transaction corresponding to the first application, the transaction associated with a first user account of the first application; responsive to identifying the request: identifying a transaction authorization data record corresponding to the transaction, the transaction authorization data record specifying, corresponding to the transaction, a second application executing on a second computing device, a specified second application state, and a specified second application state change, wherein the specified second application state is indicative of: the second application being resident on the second computing device, a prespecified second user account associated with the second application having an active authentication state on the second application, and wherein the second application state change comprises an action performed by a user at the second application within a prespecified time, the prespecified second user account being prespecified for use in authenticating the transaction for the first user account of the first application; according to the transaction authorization data record, determining, by communicating with the second application, an application state service, or the application server of the second application: whether a current state of the second application corresponds to the specified second application state, the determination verifying that the second application is resident on the first computing device and the prespecified second user account having the active authentication state with the second application; and whether the user performed the specified action within the prespecified time to effectuate the second application state change; and responsive to determining that the current state of the second application corresponds to the specified second application state according to the transaction authorization data record and that the user performed the specified action within the prespecified time: authenticating the transaction based on a verification that the second application is in the specified second application state; and processing the transaction upon successful authentication.

In Example 49, the subject matter of Example 48 includes, wherein the first application, second application, or both are web applications.

In Example 50, the subject matter of Examples 48-49 includes, wherein the specified action performed by the user on the second application is activating a user interface control.

In Example 51, the subject matter of Examples 48-50 includes, wherein the first computing device is an untrusted public device.

In Example 52, the subject matter of Examples 48-51 includes, wherein the operations of searching the transaction authorization data record using the transaction to identify the second application on the second computing device and the specified second application state comprises searching the transaction authorization data record using the type of transaction being authenticated.

In Example 53, the subject matter of Examples 48-52 includes, wherein the operations of searching the transaction authorization data record using the transaction to identify the second application on the second computing device and the specified second application state comprises searching the transaction authorization data record using risk scores associated with the user, first computing device, or the transaction.

In Example 54, the subject matter of Examples 48-53 includes, wherein the operations of searching the transaction authorization data record using the transaction to identify the second application on the second computing device and the specified second application state comprises searching the transaction authorization data record using the geolocation of the user.

In Example 55, the subject matter of Examples 48-54 includes, wherein the operations further comprise providing a notification on one of the first application, the second application, or both the first and second application to perform the specified action.

Example 56 is a computer-readable storage device, storing instructions for authenticating a transaction at a first application or an application server of the first application, the instructions, when executed by a first computing device, cause the first computing device to perform operations comprising: identifying a request for a transaction corresponding to the first application, the transaction associated with a first user account of the first application; responsive to identifying the request: identifying a transaction authorization data record corresponding to the transaction, the transaction authorization data record specifying, corresponding to the transaction, a second application executing on a second computing device, a specified second application state, and a specified second application state change, wherein the specified second application state is indicative of: the second application being resident on the second computing device, a prespecified second user account associated with the second application having an active authentication state on the second application, and wherein the second application state change comprises an action performed by a user at the second application within a prespecified time, the prespecified second user account being prespecified for use in authenticating the transaction for the first user account of the first application; according to the transaction authorization data record, determining, by communicating with the second application, an application state service, or the application server of the second application: whether a current state of the second application corresponds to the specified second application state, the determination verifying that the second application is resident on the first computing device and the prespecified second user account having the active authentication state with the second application; and whether the user performed the specified action within the prespecified time to effectuate the second application state change; and responsive to determining that the current state of the second application corresponds to the specified second application state according to the transaction authorization data record and that the user performed the specified action within the prespecified time: authenticating the transaction based on a verification that the second application is in the specified second application state; and processing the transaction upon successful authentication.

In Example 57, the subject matter of Example 56 includes, wherein the first application, second application, or both are web applications.

In Example 58, the subject matter of Examples 56-57 includes, wherein the specified action performed by the user on the second application is activating a user interface control.

In Example 59, the subject matter of Examples 56-58 includes, wherein the first computing device is an untrusted public device.

In Example 60, the subject matter of Examples 56-59 includes, wherein the operations of searching the transaction authorization data record using the transaction to identify the second application on the second computing device and the specified second application state comprises searching the transaction authorization data record using the type of transaction being authenticated.

In Example 61, the subject matter of Examples 56-60 includes, wherein the operations of searching the transaction authorization data record using the transaction to identify the second application on the second computing device and the specified second application state comprises searching the transaction authorization data record using risk scores associated with the user, first computing device, or the transaction.

In Example 62, the subject matter of Examples 56-61 includes, wherein the operations of searching the transaction authorization data record using the transaction to identify the second application on the second computing device and the specified second application state comprises searching the transaction authorization data record using the geolocation of the user.

In Example 63, the subject matter of Examples 56-62 includes, wherein the operations further comprise providing a notification on one of the first application, the second application, or both the first and second application to perform the specified action.

Example 64 is a method for authenticating a transaction on a computing device, comprising: at a first application or an application server of the first application, using one or more processors, automatically: identifying a request for the transaction corresponding to the first application installed on the computing device, the transaction associated with a first user account of the first application; responsive to identifying the request: selecting, based on a property of the transaction, and from a transaction authorization data record corresponding to the transaction, both a subset of a plurality of other applications from a prespecified set of other applications and for each application in the subset, an authentication state, where each authentication state is indicative of at least the application being resident on a specified computing device and the application having an active authentication state of a prespecified user account associated with the application, the prespecified user account prespecified for use in authenticating the transaction for the first user account of the first application, the selected subset different that a second subset that would be selected based upon a property of a second transaction different than the property of the transaction; according to the transaction authorization data record, determining, for each particular application in the subset, by communicating with the particular application, an application state service, or the application server of the particular application, whether a current state of the particular application corresponds to the specified authentication state, the determination verifying that the particular application is resident on the specified computing device and the particular application having an active authentication state of the prespecified user account associated with the application; and responsive to determining that the current states of all applications in the subset correspond to their authentication states: authenticating the transaction based on a verification that all applications in the subset are in their authentication states; and processing the transaction upon successful authentication.

In Example 65, the subject matter of Example 64 includes, wherein the property of the transaction is a transaction time, and wherein the property of the second transaction is a different transaction time.

In Example 66, the subject matter of Example 65 includes, wherein aside from transaction time, the transaction and the second transaction are identical.

In Example 67, the subject matter of Examples 64-66 includes, wherein the property of the first transaction is a prior indication of fraudulent activity on the first user account, the property of the second transaction is no prior indication of fraudulent activity on the first user account, and wherein the selected subset includes more applications than the second subset.

In Example 68, the subject matter of Examples 64-67 includes, wherein selecting, based on a property of the transaction, and from a transaction authorization data record corresponding to the transaction, both a subset of a plurality of other applications from a prespecified set of other applications and for each application in the subset, an authentication state comprises also using historical application usage data of a user to select applications normally in-use by the user during the transaction.

In Example 69, the subject matter of Examples 64-68 includes, wherein selecting, based on a property of the transaction, and from a transaction authorization data record corresponding to the transaction, both a subset of a plurality of other applications from a prespecified set of other applications and for each application in the subset, an authentication state comprises also using application security rankings.

In Example 70, the subject matter of Examples 64-69 includes, wherein at least one of the subset of the plurality of other applications is executing on a second computing device different than the specified computing device.

In Example 71, the subject matter of Example 70 includes, wherein a different at least one of the subset of the plurality of other applications is executing on the specified computing device.

Example 72 is a computing device for authenticating a transaction, the computing device comprising: a hardware processor; a memory, storing instructions, which when executed by the hardware processor, causing the hardware processor to perform operations comprising: at a first application or an application server of the first application, automatically: identifying a request for the transaction corresponding to the first application installed on the computing device, the transaction associated with a first user account of the first application; responsive to identifying the request: selecting, based on a property of the transaction, and from a transaction authorization data record corresponding to the transaction, both a subset of a plurality of other applications from a prespecified set of other applications and for each application in the subset, an authentication state, where each authentication state is indicative of at least the application being resident on a specified computing device and the application having an active authentication state of a prespecified user account associated with the application, the prespecified user account prespecified for use in authenticating the transaction for the first user account of the first application, the selected subset different that a second subset that would be selected based upon a property of a second transaction different than the property of the transaction; according to the transaction authorization data record, determining, for each particular application in the subset, by communicating with the particular application, an application state service, or the application server of the particular application, whether a current state of the particular application corresponds to the specified authentication state, the determination verifying that the particular application is resident on the specified computing device and the particular application having an active authentication state of the prespecified user account associated with the application; and responsive to determining that the current states of all applications in the subset correspond to their authentication states: authenticating the transaction based on a verification that all applications in the subset are in their authentication states; and processing the transaction upon successful authentication.

In Example 73, the subject matter of Example 72 includes, wherein the property of the transaction is a transaction time, and wherein the property of the second transaction is a different transaction time.

In Example 74, the subject matter of Example 73 includes, wherein aside from transaction time, the transaction and the second transaction are identical.

In Example 75, the subject matter of Examples 72-74 includes, wherein the property of the first transaction is a prior indication of fraudulent activity on the first user account, the property of the second transaction is no prior indication of fraudulent activity on the first user account, and wherein the selected subset includes more applications than the second subset.

In Example 76, the subject matter of Examples 72-75 includes, wherein selecting, based on a property of the transaction, and from a transaction authorization data record corresponding to the transaction, both a subset of a plurality of other applications from a prespecified set of other applications and for each application in the subset, an authentication state comprises also using historical application usage data of a user to select applications normally in-use by the user during the transaction.

In Example 77, the subject matter of Examples 72-76 includes, wherein selecting, based on a property of the transaction, and from a transaction authorization data record corresponding to the transaction, both a subset of a plurality of other applications from a prespecified set of other applications and for each application in the subset, an authentication state comprises also using application security rankings.

In Example 78, the subject matter of Examples 72-77 includes, wherein at least one of the subset of the plurality of other applications is executing on a second computing device different than the specified computing device.

In Example 79, the subject matter of Example 78 includes, wherein a different at least one of the subset of the plurality of other applications is executing on the specified computing device.

Example 80 is a computer-readable storage device, storing instructions for authenticating a transaction at a first application or an application server of the first application, the instructions, when executed by a computing device, cause the computing device to perform operations comprising: identifying a request for the transaction corresponding to the first application installed on the computing device, the transaction associated with a first user account of the first application; responsive to identifying the request: selecting, based on a property of the transaction, and from a transaction authorization data record corresponding to the transaction, both a subset of a plurality of other applications from a prespecified set of other applications and for each application in the subset, an authentication state, where each authentication state is indicative of at least the application being resident on a specified computing device and the application having an active authentication state of a prespecified user account associated with the application, the prespecified user account prespecified for use in authenticating the transaction for the first user account of the first application, the selected subset different that a second subset that would be selected based upon a property of a second transaction different than the property of the transaction; according to the transaction authorization data record, determining, for each particular application in the subset, by communicating with the particular application, an application state service, or the application server of the particular application, whether a current state of the particular application corresponds to the specified authentication state, the determination verifying that the particular application is resident on the specified computing device and the particular application having an active authentication state of the prespecified user account associated with the application; and responsive to determining that the current states of all applications in the subset correspond to their authentication states: authenticating the transaction based on a verification that all applications in the subset are in their authentication states; and processing the transaction upon successful authentication.

In Example 81, the subject matter of Example 80 includes, wherein the property of the transaction is a transaction time, and wherein the property of the second transaction is a different transaction time.

In Example 82, the subject matter of Example 81 includes, wherein aside from transaction time, the transaction and the second transaction are identical.

In Example 83, the subject matter of Examples 80-82 includes, wherein the property of the first transaction is a prior indication of fraudulent activity on the first user account, the property of the second transaction is no prior indication of fraudulent activity on the first user account, and wherein the selected subset includes more applications than the second subset.

In Example 84, the subject matter of Examples 80-83 includes, wherein selecting, based on a property of the transaction, and from a transaction authorization data record corresponding to the transaction, both a subset of a plurality of other applications from a prespecified set of other applications and for each application in the subset, an authentication state comprises also using historical application usage data of a user to select applications normally in-use by the user during the transaction.

In Example 85, the subject matter of Examples 80-84 includes, wherein selecting, based on a property of the transaction, and from a transaction authorization data record corresponding to the transaction, both a subset of a plurality of other applications from a prespecified set of other applications and for each application in the subset, an authentication state comprises also using application security rankings.

In Example 86, the subject matter of Examples 80-85 includes, wherein at least one of the subset of the plurality of other applications is executing on a second computing device different than the specified computing device.

In Example 87, the subject matter of Example 86 includes, wherein a different at least one of the subset of the plurality of other applications is executing on the specified computing device.

Example 88 is a method for verifying a transaction, the method comprising: identifying a plurality of applications associated with a user; selecting, for a particular type of transaction to be initiated by a first application, a subset of the plurality of applications that meet specified authentication criteria; for each particular application in the subset: determining state information of the particular application that meets the specified authentication criteria; authenticating with the particular application, an application server of the particular application, or an application state service to obtain an authentication key; identifying a user identifier for the user on the particular application and a unique device identifier where the application is installed; and storing application data for the particular application in a transaction authorization data record in a database, the application data comprising the state information, user identifier, authentication key, and device identifier; receiving a transaction request in the first application corresponding to the particular type of transaction to be initiated, and in response: retrieving the transaction authorization data record from the database for the transaction type; authenticating the transaction by verifying, for each particular application indicated in the transaction authorization data record, that the particular application is executing on a device with the correct device identifier and that the particular application is in the required state, wherein the verification uses the stored user identifier, communication channel information, and authentication key to interact with the application, its server, or an application state service.

In Example 89, the subject matter of Example 88 includes, wherein identifying the plurality of applications associated with the user comprises communicating with an application service, scanning a user device of the user; or receiving identifiers of the plurality of applications from a user interface.

In Example 90, the subject matter of Examples 88-89 includes, wherein the plurality of applications includes at least one web application.

In Example 91, the subject matter of Examples 88-90 includes, wherein the specified authentication criteria comprises a security threshold, and wherein selecting, for the transaction initiated by the first application, the subset of the plurality of applications that meet specified authentication criteria comprises comparing a prespecified security level of each application in the plurality of applications with the security threshold and selecting for the subset, those applications that meet the security threshold.

In Example 92, the subject matter of Examples 88-91 includes, wherein the unique device identifier includes, or is based upon, one or more of: a MAC address of the device, a universally unique identifier (UUID), or an Internet Protocol (IP) address.

In Example 93, the subject matter of Examples 88-92 includes, wherein the application data further comprises communication channel information for communicating with each particular application, the communication channel information including an API endpoint of the particular application.

In Example 94, the subject matter of Examples 88-93 includes, wherein identifying the user identifier for the user on the particular application comprises receiving the user identifier from one of: a user interface, or an application server of the application.

Example 95 is a computing device for verifying a transaction, the computing device comprising: a hardware processor; a memory, the memory storing instructions, which when executed by the hardware processor causes the computing device to perform operations comprising: identifying a plurality of applications associated with a user; selecting, for a particular type of transaction to be initiated by a first application, a subset of the plurality of applications that meet specified authentication criteria; for each particular application in the subset: determining state information of the particular application that meets the specified authentication criteria; authenticating with the particular application, an application server of the particular application, or an application state service to obtain an authentication key; identifying a user identifier for the user on the particular application and a unique device identifier where the application is installed; and storing application data for the particular application in a transaction authorization data record in a database, the application data comprising the state information, user identifier, authentication key, and device identifier; receiving a transaction request in the first application corresponding to the particular type of transaction to be initiated, and in response: retrieving the transaction authorization data record from the database for the transaction type; authenticating the transaction by verifying, for each particular application indicated in the transaction authorization data record, that the particular application is executing on a device with the correct device identifier and that the particular application is in the required state, wherein the verification uses the stored user identifier, communication channel information, and authentication key to interact with the application, its server, or an application state service.

In Example 96, the subject matter of Example 95 includes, wherein the operations of identifying the plurality of applications associated with the user comprises communicating with an application service, scanning a user device of the user; or receiving identifiers of the plurality of applications from a user interface.

In Example 97, the subject matter of Examples 95-96 includes, wherein the plurality of applications includes at least one web application.

In Example 98, the subject matter of Examples 95-97 includes, wherein the specified authentication criteria comprises a security threshold, and wherein the operations of selecting, for the transaction initiated by the first application, the subset of the plurality of applications that meet specified authentication criteria comprises comparing a prespecified security level of each application in the plurality of applications with the security threshold and selecting for the subset, those applications that meet the security threshold.

In Example 99, the subject matter of Examples 95-98 includes, wherein the unique device identifier includes, or is based upon, one or more of: a MAC address of the device, a universally unique identifier (UUID), or an Internet Protocol (IP) address.

In Example 100, the subject matter of Examples 95-99 includes, wherein the application data further comprises communication channel information for communicating with each particular application, the communication channel information including an API endpoint of the particular application.

In Example 101, the subject matter of Examples 95-100 includes, wherein the operations of identifying the user identifier for the user on the particular application comprises receiving the user identifier from one of: a user interface, or an application server of the application.

Example 102 is a computer-readable storage device, storing instructions for verifying a transaction, the instructions, when executed by a computing device, cause the computing device to perform operations comprising: identifying a plurality of applications associated with a user; selecting, for a particular type of transaction to be initiated by a first application, a subset of the plurality of applications that meet specified authentication criteria; for each particular application in the subset: determining state information of the particular application that meets the specified authentication criteria; authenticating with the particular application, an application server of the particular application, or an application state service to obtain an authentication key; identifying a user identifier for the user on the particular application and a unique device identifier where the application is installed; and storing application data for the particular application in a transaction authorization data record in a database, the application data comprising the state information, user identifier, authentication key, and device identifier; receiving a transaction request in the first application corresponding to the particular type of transaction to be initiated, and in response: retrieving the transaction authorization data record from the database for the transaction type; authenticating the transaction by verifying, for each particular application indicated in the transaction authorization data record, that the particular application is executing on a device with the correct device identifier and that the particular application is in the required state, wherein the verification uses the stored user identifier, communication channel information, and authentication key to interact with the application, its server, or an application state service.

In Example 103, the subject matter of Example 102 includes, wherein the operations of identifying the plurality of applications associated with the user comprises communicating with an application service, scanning a user device of the user; or receiving identifiers of the plurality of applications from a user interface.

In Example 104, the subject matter of Examples 102-103 includes, wherein the plurality of applications includes at least one web application.

In Example 105, the subject matter of Examples 102-104 includes, wherein the specified authentication criteria comprises a security threshold, and wherein the operations of selecting, for the transaction initiated by the first application, the subset of the plurality of applications that meet specified authentication criteria comprises comparing a prespecified security level of each application in the plurality of applications with the security threshold and selecting for the subset, those applications that meet the security threshold.

In Example 106, the subject matter of Examples 102-105 includes, wherein the unique device identifier includes, or is based upon, one or more of: a MAC address of the device, a universally unique identifier (UUID), or an Internet Protocol (IP) address.

In Example 107, the subject matter of Examples 102-106 includes, wherein the application data further comprises communication channel information for communicating with each particular application, the communication channel information including an API endpoint of the particular application.

In Example 108, the subject matter of Examples 102-107 includes, wherein the operations of identifying the user identifier for the user on the particular application comprises receiving the user identifier from one of: a user interface, or an application server of the application.

Example 109 is at least one machine-readable medium including instructions that, when executed by processing circuitry, cause the processing circuitry to perform operations to implement of any of Examples 1-108.

Example 110 is an apparatus comprising means to implement of any of Examples 1-108.

Example 111 is a system to implement of any of Examples 1-108.

Example 112 is a method to implement of any of Examples 1-108.

What is claimed is:

1. A method for authenticating a transaction on a computing device, comprising:

at a first application or an application server of the first application, using one or more processors, automatically:

identifying a request for the transaction corresponding to the first application executing on the computing device, the transaction associated with a first user account of the first application; and responsive to identifying the request:

identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application;

according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record:

authenticating the transaction based on a verification that the second application is in the specified second application state; and processing the transaction upon successful authentication.

2. The method of claim 1, wherein the transaction authorization data record includes a list of applications and corresponding states required for transaction verification based upon a type of the transaction.

3. The method of claim 1, further comprising the step of sending a notification to a user to log into the second application if the second application is in a non-logged-in state.

4. The method of claim 1, further comprising:

identifying a second request for a second transaction of a type different than the transaction, the second transaction corresponding to the first application and associated with the first user account of the first application; and responsive to identifying the second request:

identifying a third application, a fourth application, a specified third application state, and a specified fourth application state based upon a second transaction authorization data record and the second transaction;

identifying a current state of the third application by communicating with the third application, the application state service, or a third application server of the third application;

identifying a current state of the fourth application by communicating with the fourth application, the application state service, or a fourth application server of the fourth application;

determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state:

authenticating the second transaction; and processing the second transaction upon the successful authentication.

5. The method of claim 1, wherein the second application is selected from a group of applications preselected by a user.

6. The method of claim 1, wherein identifying the current state of the second application further comprises verifying that a unique identifier of an authenticated session of the second application corresponds to a unique identifier of the computing device.

7. The method of claim 1, further comprising:

identifying a second request for a second transaction of a type different than the transaction, the second transaction corresponding to the first application and associated with the first user account of the first application; and responsive to identifying the second request:

identifying a third application and a specified third application state based upon a transaction authorization data record and the transaction, wherein the specified third application state is indicative of whether the third application is in a logged-in state or a non-logged-in state with respect to a third defined user account associated with the third application, the third defined user account having a prespecified relationship with the first user account of the first application;

identifying a current state of the third application by communicating with the third application, the application state service, or a third application server of the third application;

determining that a current state of the third application corresponds to the specified third application state; and responsive to determining that the current state of the third application corresponds to the specified third application state:

authenticating the second transaction based on a verification that the third application is in the specified third application state; and processing the second transaction upon successful authentication.

8. The method of claim 1, further comprising:

identifying a second request for a second transaction of a type different than the transaction, the second transaction corresponding to the first application and associated with the first user account of the first application; and responsive to identifying the second request:

identifying, based upon the second transaction, a third application state of the second application, the third application state different than the specified second application state;

identifying a current state of the second application by communicating with the second application, the application state service, or the application server of the first application;

determining that the current state of the second application corresponds to the third application state; and responsive to determining that the current state of the second application corresponds to the third application state:

authenticating the transaction based on a verification that the second application is in the third application state; and processing the second transaction upon successful authentication.

9. The method of claim 1, wherein the operations are performed without user input.

10. The method of claim 1, further comprising:

receiving an identifier of the transaction, the second application, and the prespecified second user account from a user in a graphical user interface; and populating the transaction authorization data record using the received identifier, the second application, and the prespecified second user account.

11. The method of claim 1, wherein the transaction is authenticating a user to the first application.

12. The method of claim 1, further comprising:

identifying a second request for a second transaction corresponding to the first application executing on the computing device, the second transaction associated with the first user account of the first application; and responsive to identifying the second request:

identifying a second transaction authorization data record corresponding to the second transaction, the second transaction authorization data record specifying, corresponding to the second transaction, the second application and a specified third application state, wherein the specified third application state is different than the specified second application state;

according to the second transaction authorization data record, determining, by communicating with the second application, the application state service, or the application server of the second application, whether a current state of the second application corresponds to the specified third application state; and responsive to determining that the current state of the second application does not corresponds to the specified third application state according to the transaction authorization data record, failing the authentication and denying the transaction.

13. The method of claim 1, further comprising:

identifying a second request for a second transaction of a type different than the transaction, the second transaction corresponding to the first application and associated with the first user account of the first application; and responsive to identifying the second request:

identifying a third application, a fourth application, a specified third application state, and a fourth application state based upon a second transaction authorization data record and the second transaction;

identifying a current state of the third application by communicating with the third application, the application state service, or a third application server of the third application;

identifying a current state of the fourth application by communicating with the fourth application, the application state service, or a fourth application server of the fourth application;

determining that a current state of the third application does not correspond to the specified third application state or the current state of the fourth application does not correspond to the fourth application state; and responsive to determining that the current state of the third application does not correspond to the specified third application state or the current state of the fourth application does not correspond to the fourth application state:

denying the authentication and cancelling the transaction.

14. A computing device for authenticating a transaction, the computing device comprising:

a hardware processor;

a memory, storing instructions, which when executed by the hardware processor, causing the hardware processor to perform operations comprising:

at a first application or an application server of the first application, automatically:

identifying a request for the transaction corresponding to the first application executing on the computing device, the transaction associated with a first user account of the first application; and responsive to identifying the request:

identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application;

according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record:

authenticating the transaction based on a verification that the second application is in the specified second application state; and processing the transaction upon successful authentication.

15. The computing device of claim 14, wherein the transaction authorization data record includes a list of applications and corresponding states required for transaction verification based upon a type of the transaction.

16. The computing device of claim 14, wherein the operations further comprise sending a notification to a user to log into the second application if the second application is in a non-logged-in state.

17. The computing device of claim 14, wherein the operations further comprise:

identifying a second request for a second transaction of a type different than the transaction, the second transaction corresponding to the first application and associated with the first user account of the first application; and responsive to identifying the second request:

identifying a third application, a fourth application, a specified third application state, and a specified fourth application state based upon a second transaction authorization data record and the second transaction;

identifying a current state of the third application by communicating with the third application, the application state service, or a third application server of the third application;

identifying a current state of the fourth application by communicating with the fourth application, the application state service, or a fourth application server of the fourth application;

determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state:

authenticating the second transaction; and processing the second transaction upon the successful authentication.

18. A non-transitory computer-readable medium, storing instructions for authenticating a transaction at a first application or an application server of the first application, the instructions, when executed by a computing device, cause the computing device to perform operations comprising:

identifying a request for the transaction corresponding to the first application executing on the computing device, the transaction associated with a first user account of the first application; and responsive to identifying the request:

identifying a transaction authorization data record corresponding to the transaction, the transaction authorization data record specifying, corresponding to the transaction, a second application and a specified second application state, wherein the specified second application state is indicative of both the second application being resident on the computing device and a prespecified second user account associated with the second application having an active authentication state on the second application, the prespecified second user account being prespecified for use in authenticating the transaction for the first user account of the first application;

according to the transaction authorization data record, determining, by communicating with the second application, an application state service, or the application server of the second application, whether a current state of the second application corresponds to the specified second application state, the determination verifying that the second application is resident on the computing device and the prespecified second user account having the active authentication state with the second application; and responsive to determining that the current state of the second application corresponds to the specified second application state according to the transaction authorization data record:

authenticating the transaction based on a verification that the second application is in the specified second application state; and processing the transaction upon successful authentication.

19. The non-transitory computer-readable medium of claim 18, wherein the operations further comprise:

identifying a second request for a second transaction of a type different than the transaction, the second transaction corresponding to the first application and associated with the first user account of the first application; and responsive to identifying the second request:

identifying a third application, a fourth application, a specified third application state, and a specified fourth application state based upon a second transaction authorization data record and the second transaction;

identifying a current state of the third application by communicating with the third application, the application state service, or a third application server of the third application;

identifying a current state of the fourth application by communicating with the fourth application, the application state service, or a fourth application server of the fourth application;

determining that a current state of the third application corresponds to the specified third application state and the current state of the fourth application corresponds to the specified fourth application state; and responsive to determining that the current state of the third application corresponds to the specified third application state and the current state of the fourth application corresponds to the specified fourth application state:

authenticating the second transaction; and processing the second transaction upon the successful authentication.

20. The non-transitory computer-readable medium of claim 18, wherein the operations further comprise:

identifying a second request for a second transaction of a type different than the transaction, the second transaction corresponding to the first application and associated with the first user account of the first application; and responsive to identifying the second request:

identifying a third application and a specified third application state based upon a transaction authorization data record and the transaction, wherein the specified third application state is indicative of whether the third application is in a logged-in state or a non-logged-in state with respect to a third defined user account associated with the third application, the third defined user account having a prespecified relationship with the first user account of the first application;

identifying a current state of the third application by communicating with the third application, the application state service, or a third application server of the third application;

determining that a current state of the third application corresponds to the specified third application state; and responsive to determining that the current state of the third application corresponds to the specified third application state:

authenticating the second transaction based on a verification that the third application is in the specified third application state; and processing the second transaction upon successful authentication.

* * * * *